United States Patent
Hurley et al.

(10) Patent No.: US 10,496,995 B2
(45) Date of Patent: Dec. 3, 2019

(54) FACILITATING PAYMENT TRANSACTIONS BETWEEN USERS OF A PLURALITY OF PAYMENT PROVIDERS

(71) Applicant: Facebook, Inc., Menlo Park, CA (US)

(72) Inventors: Kevin Patrick Hurley, Menlo Park, CA (US); Sohil Maru, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/583,999

(22) Filed: May 1, 2017

(65) Prior Publication Data
US 2018/0315051 A1    Nov. 1, 2018

(51) Int. Cl.
*G06Q 20/10* (2012.01)
*G06Q 20/40* (2012.01)
(Continued)

(52) U.S. Cl.
CPC ......... *G06Q 20/4016* (2013.01); *G06Q 20/02* (2013.01); *G06Q 20/10* (2013.01);
(Continued)

(58) Field of Classification Search
CPC .................................................. G06Q 20/4016
(Continued)

(56) References Cited

U.S. PATENT DOCUMENTS 9,710,812 B2 * 7/2017 Doran .................... G06Q 20/08
9,757,644 B2 * 9/2017 Rose ...................... G06Q 20/12
(Continued)

FOREIGN PATENT DOCUMENTS

| KR | 10-2014-0095148 A | 8/2014 |
|---|---|---|
| KR | 10-2015-0126678 A | 11/2015 |
| WO | WO 2018/203914 | 11/2018 |

OTHER PUBLICATIONS

Merging Social Media payments and Mobile devices by Michael Hogan at Mitek Company Nov. 30, 2015 (Year: 2015).*

(Continued)

*Primary Examiner* — Bruce I Ebersman
*Assistant Examiner* — John A Anderson
(74) *Attorney, Agent, or Firm* — Keller Jolley Preece

(57) ABSTRACT

The present disclosure relates to systems, methods, and devices for facilitating payment transactions using an application program interface. In particular, the systems and methods allow payment providers to integrate with a social network and facilitates payment transactions by providing instructions to the payment providers based on the payment providers being integrated with the social network. For example, one or more embodiments identify a payment provider associated with a payment account of a user requesting to initiate a payment transaction. One or more embodiments then determine instructions to send to the payment provider based on transaction information and then send the instructions to the payment provider to cause the payment provider to process the transaction according to the transaction information. Additionally, one or more embodiments cause payment providers to communicate with each other for processing payment transactions involving users of the social network.

20 Claims, 19 Drawing Sheets

(51) Int. Cl.
  *G06Q 20/22*   (2012.01)
  *G06Q 50/00*   (2012.01)
  *G06Q 20/02*   (2012.01)
  *G06Q 20/32*   (2012.01)
(52) U.S. Cl.
  CPC .......... *G06Q 20/223* (2013.01); *G06Q 20/32* (2013.01); *G06Q 50/01* (2013.01)
(58) Field of Classification Search
  USPC .......................................................... 705/44
  See application file for complete search history.

(56)         References Cited

U.S. PATENT DOCUMENTS

| | | |
|---|---|---|
| 2012/0143761 A1 | 6/2012 | Doran et al. |
| 2014/0012654 A1* | 1/2014 | Stewart .............. G06Q 30/0234 |
| | | 705/14.34 |
| 2014/0019352 A1* | 1/2014 | Shrivastava ....... G06Q 20/3674 |
| | | 705/41 |
| 2016/0117651 A1 | 4/2016 | Davis |
| 2016/0171481 A1 | 6/2016 | McElmurry et al. |
| 2018/0046623 A1* | 2/2018 | Faith ..................... G06Q 30/06 |

OTHER PUBLICATIONS

STIC search report (Year: 2019).*
Extended European Search Report as received in European Application 17202091.9 dated Dec. 20, 2017.
International Search Report and Written Opinion as received in PCT/US2017/031884 dated Jan. 18, 2018.

* cited by examiner

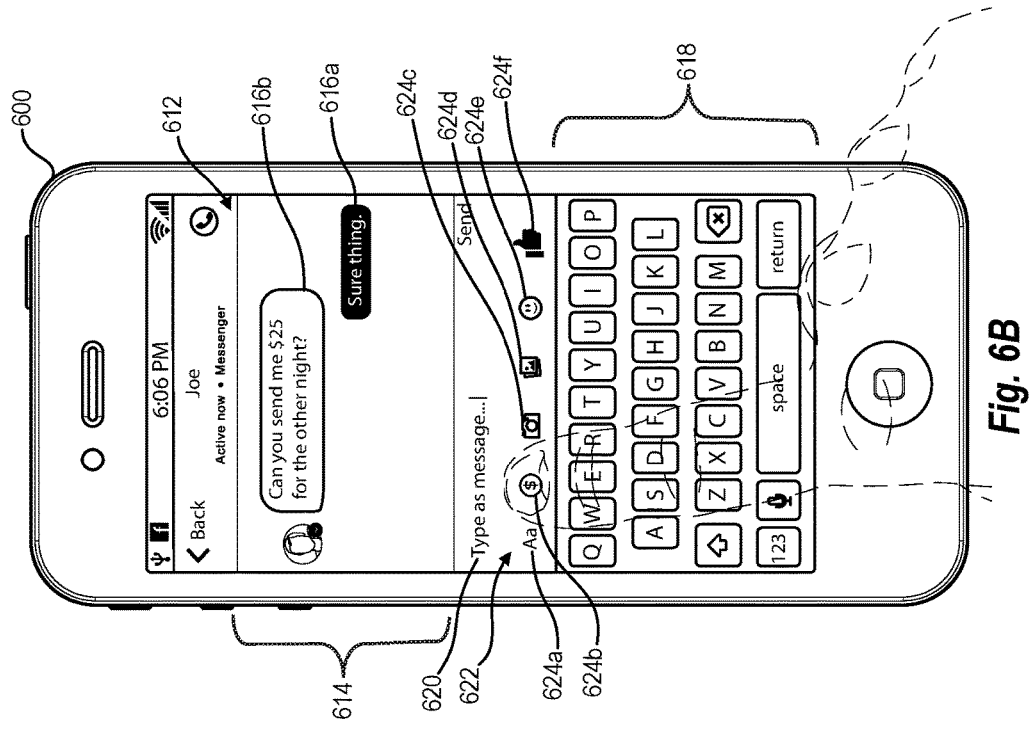
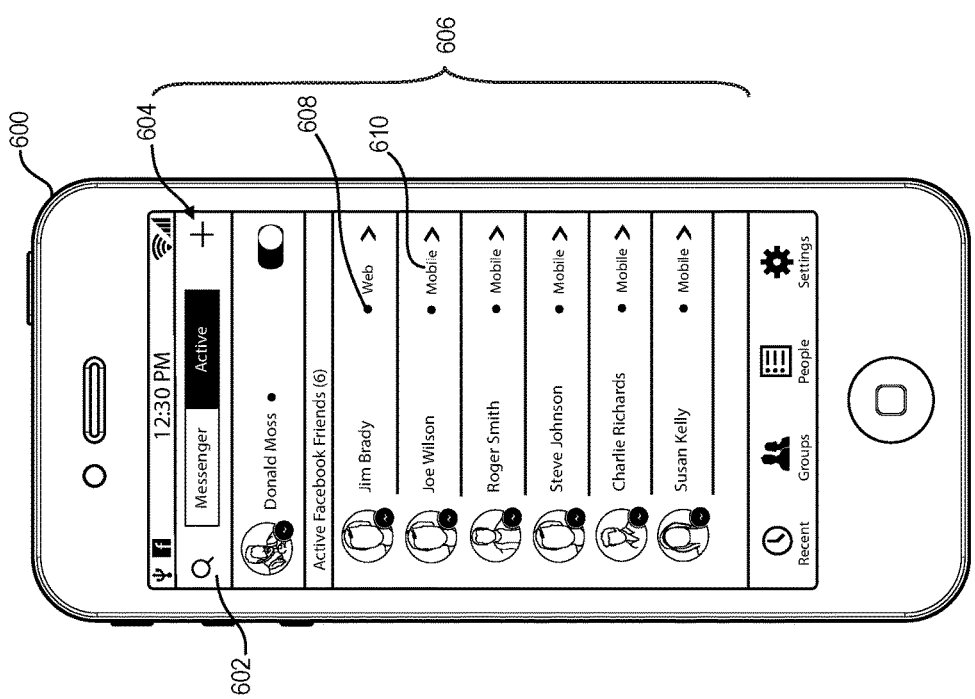
Fig. 6B
Fig. 6A

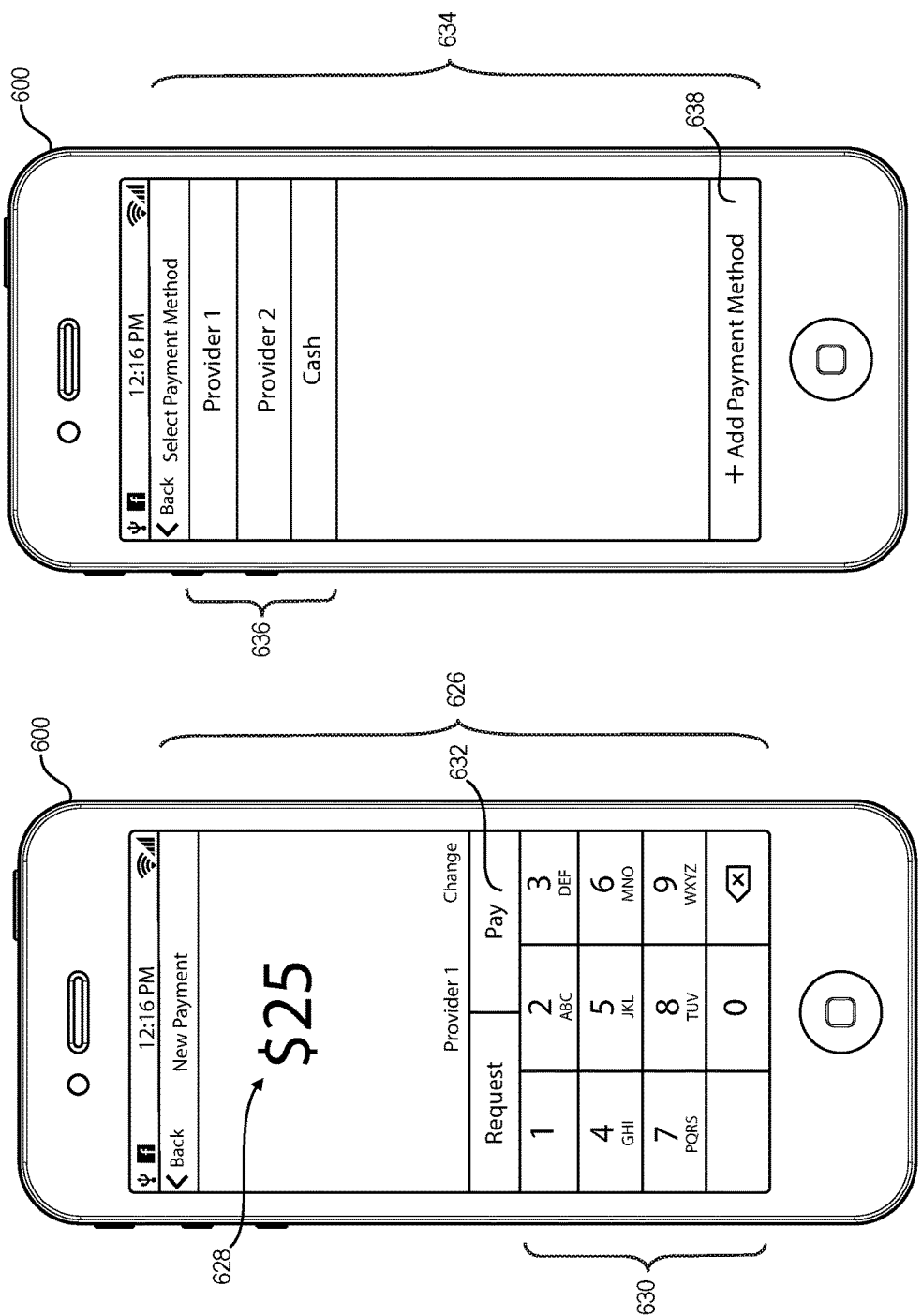

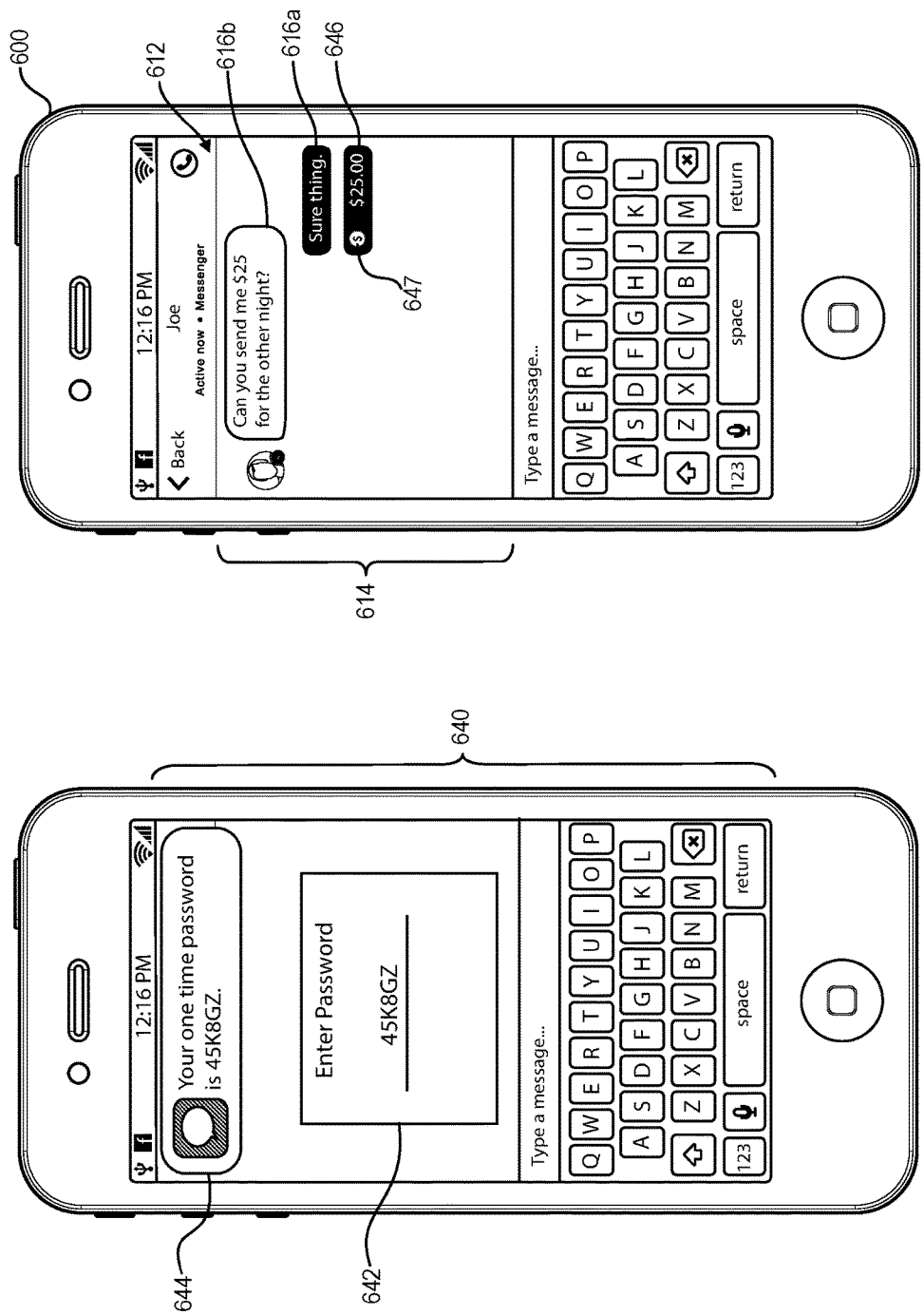

FACILITATING PAYMENT TRANSACTIONS BETWEEN USERS OF A PLURALITY OF PAYMENT PROVIDERS

BACKGROUND

Background and Relevant Art

Electronic networking systems allow users to perform payment transactions with others via software applications on one or more types of devices (e.g., desktop devices and mobile devices). Some electronic networking systems allow users to perform payment transactions with other users (e.g., peer-to-peer payment transactions or peer-to business payment transactions). For example, some electronic networking systems allow users to enter into payment transactions to transfer funds to another user by way of an electronic payment application on a computing device.

Many conventional electronic payment systems allow users to register with a payment provider for transferring funds to other users. Specifically, conventional electronic payment systems integrate with payment providers using integration methods provided by the payment providers to allow users to transfer funds to other users who have also registered with the same payment provider or payment service. While many conventional electronic payment systems provide certain advantages, they also have various drawbacks. In particular, requiring users to be registered with the same payment provider to transfer funds can introduce inconveniences or difficulties. In particular, because there are so many different payment providers for engaging in electronic payment transactions, users often end up registering with multiple payment providers in order to transfer funds to a variety of other users. In some cases, some users end up registering with only a single payment provider, and thus may be unwilling or unable to engage in electronic payment transactions with certain other users.

Additionally, many conventional electronic payment systems are standalone payment services in which both the sender and the recipient of the payment must create an account specifically for the payment service. Due to the fact that conventional electronic payment systems have no other use outside of sending and receiving payments, it is often the case that two people are not needing to transfer a payment do not have an account for the same payment service. Thus, with many conventional electronic payment systems, the sender, recipient, or both have to go through a time-consuming process of setting up an account, causing the payment process to be inconvenient and burdensome.

In addition to simply setting up an account associated with a particular conventional electronic payment systems, the payment process that many conventional electronic payment systems use is burdensome and complicated. For example, many conventional electronic payment systems process a payment by sending a series of emails with links. Users must click on the email links to continue the payment process, such as accepting or denying a payment. Therefore, the payment processing steps are not intuitive and often cause user confusion. In addition, the processing steps are time-consuming and cause user frustration during the payment process.

Additionally, payment providers, regulations, and other aspects of electronic payment processes can vary based on the geographic location (e.g., country) and even the payment service of each user. For instance, certain geographic locations can have greatly differing requirements or processes for performing payment transactions. As such, transferring payment transactions in certain geographical regions can require payment systems to know and comply with the regulatory schemes and security requirements for each of the different locations and for each of the different payment providers. Conventional payment systems are often unable to provide payment transactions that have certain payment requirements based on the lack of infrastructure of the conventional systems and/or of the payment services. The foregoing issues are often magnified in developing countries where movement of money can be difficult and limit economic growth and development.

Accordingly, there are a number of disadvantages with conventional electronic payment systems and methods.

SUMMARY

One or more embodiments described herein provide benefits and/or solve one or more of the foregoing or other problems in the art with systems and methods to facilitate payment transactions between users of a networking system. In particular, the systems and methods provide an application program interface that allows a plurality of different providers to integrate with a networking system. By allowing different providers to integrate with the networking system using the application program interface, one or more embodiments leverage the networking system to allow users of various providers to engage in payment transactions with each other. Thus, the systems and methods provide a centralized system that facilitates payment transactions between users even if the users use different providers.

For example, the systems and methods use the application program interface to provide instructions to one or more payment providers when a user attempts to initiate a payment transaction with another user via the networking application. Specifically, in response to receiving a request to initiate a payment transaction from a user, the systems and methods identify payment accounts associated with the sender(s) and recipient(s) and provide instructions to the payment provider(s) of the sender(s) that cause the payment provider(s) to initiate and process the payment transaction. Accordingly, one or more embodiments provide instructions that cause a payment provider to communicate with one or more other payment providers to transfer funds from one payment account to another payment account.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

Various embodiments will be described and explained with additional specificity and detail through the use of the accompanying drawings in which:

FIGS. 6A-6J illustrate user interfaces for facilitating a payment transaction between a sender and a recipient in accordance with one or more embodiments;

DETAILED DESCRIPTION

Figure 1:
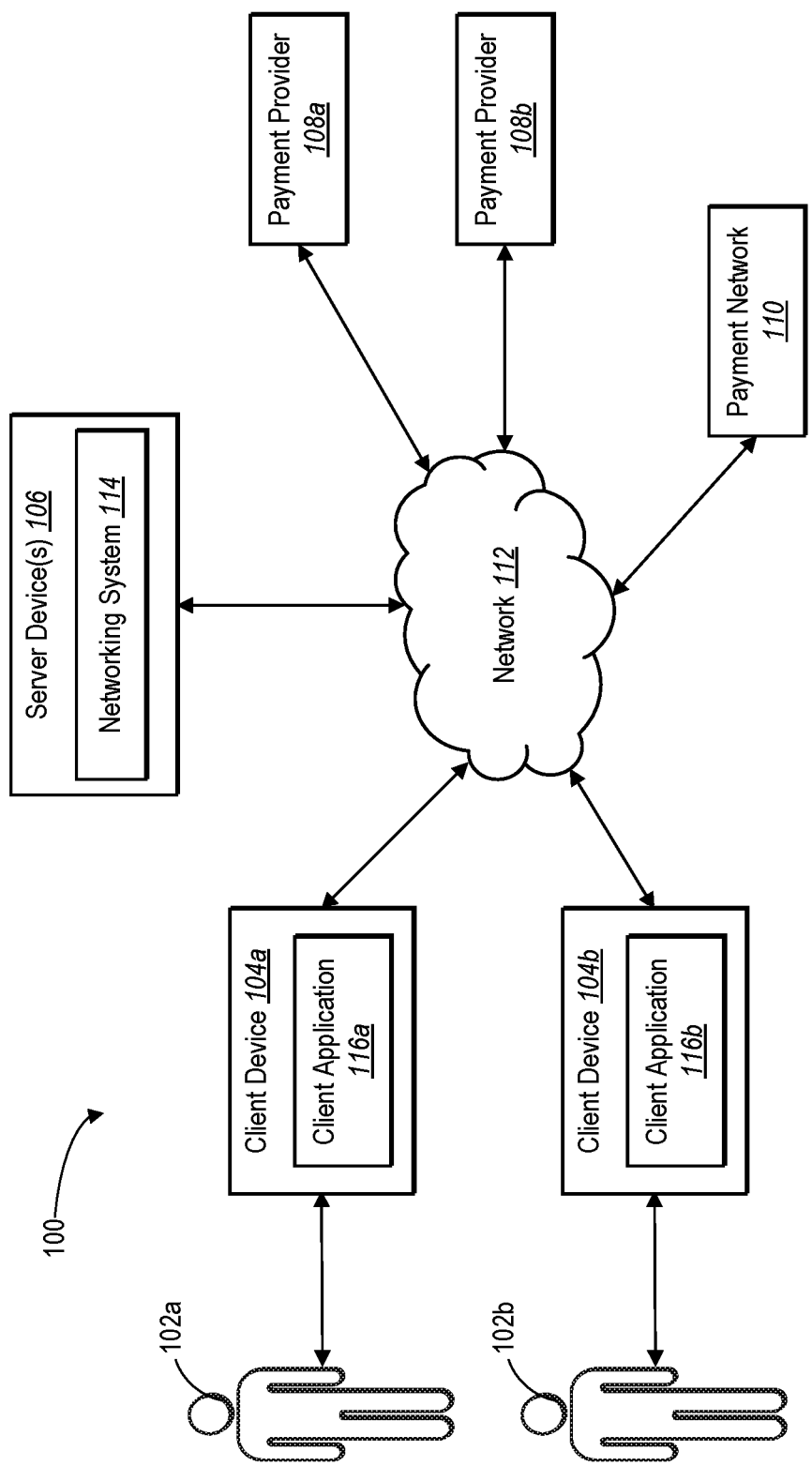
FIG. 1 illustrates a schematic diagram of an example environment in which a networking system facilitates the sending of messages and payments in accordance with one or more embodiments.

Embodiments of the present disclosure provide a networking system that provides users with the ability to engage in payment transactions. In particular, one or more embodiments provide a networking system that allows users to enter into payment transactions with co-users (e.g., peers or merchants/businesses) of the networking system through one or more payment providers. For example, the networking system provides an application program interface which payment providers access to integrate with the networking system. By allowing payment providers to integrate with the networking system using the application program interface, the networking system provides instructions to the payment providers that cause the payment providers to interact with and communicate with each other to process payment transactions.

As mentioned, the networking system allows users to enter into payment transactions with each other using a variety of payment providers. Specifically, the networking system (e.g., a social networking system) allows a user to initiate a payment transaction to transfer funds to a co-user of the networking system. The user can select a payment provider with which the user is registered or with which the user has a payment account to fund the payment transaction. In response to the request to initiate the payment transaction, the networking system identifies the payment provider and sends one or more instructions to the payment provider to process the payment transaction.

Additionally, the networking system facilitates payment transactions between a user and a co-user even if the co-user is not registered with the payment provider of the user. For instance, the co-user may be registered with a different payment provider. In connection with the payment transaction, the networking system sends instructions to the payment provider of the user to cause the payment provider of the user to communicate with the payment provider of the co-user to transfer the funds from a payment account of the user to a payment account of the co-user.

In addition to facilitating payment transactions between users of different payment providers, the networking system also facilitates payment transactions involving users who are not registered with an integrated payment provider. Specifically, the networking system can determine that a recipient co-user is not registered with a participating payment provider. The networking system can send instructions to a payment provider to create a temporary account (also referred to as a "no-load account") that temporarily stores funds from the payment account of the sender user. The co-user can then access the funds from the temporary account.

The networking system also facilitates group payment transactions involving more than two users of the networking system. For instance, the networking system can facilitate a payment transaction involving a plurality of senders and/or recipients by providing instructions to one or more payment providers to separate the payment transaction into a plurality of payment transactions. As such, the networking system can provide instructions to the payment provider(s) to transfer funds from each payment account of each sender and then transfer the funds to each payment account of each recipient in a plurality of separate payment transactions.

As mentioned, the networking system described herein provides advantages over conventional electronic payment systems. In particular, the networking system provides consistency and ease in electronic payment transactions. By implementing an application program interface that allows payment providers to integrate with the networking system (in contrast to conventional systems, which integrate with the payment providers), one or more embodiments of the networking system provides users of the networking system with a centralized electronic payment experience. As such, the networking system allows users to engage in payment transactions with co-users of the networking system within a single networking application.

The networking system also provides users across a variety of different geographic locations (e.g., countries) the ability to engage in a consistent electronic payment experience using payment providers that are specific to the geographic locations. In particular, the consistent electronic payment experience is based on the payment providers integrating with the networking system using the application program interface. The payment providers can then leverage the application program interface (e.g., by making the appropriate application program interface calls) to ensure that the payment processes meet the standards of the specific geographic locations.

Additionally, as mentioned, the networking system allows users to engage in payment transactions with co-users even if the co-users are not registered (e.g., do not have a payment account) with the same payment provider. Specifically, leveraging the application program interface to provide instructions to a payment provider to cause the payment provider to communicate with another payment provider provides a communication channel for payment providers to process payment transactions between users of the networking system. Thus, the networking system provides flexibility to users of the networking system by enabling payment transactions between users who may have otherwise been unable to enter into such payment transactions using conventional electronic payment systems that are specific to individual payment providers.

Thus, one or more embodiments of the networking system increase flexibility by enabling payment providers to process payment transactions with other payment providers despite not having a formal relationship or integration. In particular, by providing an application programming interface, the networking system allows a payment provider to integrate with a single entity (the networking system) and yet have the ability to interact with a plurality of different payment providers. As such, in addition to providing increased flexibility, the networking system reduces complexity.

In one or more embodiments, the networking system comprises more users than a payment provider integrated with the networking system. Thus, by integrating with the networking system via the application programming interface, the networking system provides the payment provider the ability to allow its users to send and receive payments from a larger number of users. In other words, the networking system provides greater users of payment providers that have integrated with the networking system more functionality and capability.

As discussed in greater detail below, in one or more embodiments, the networking system comprises a messaging system. By integrating an electronic payment system and a messaging system, the networking system can provide users with the ability to send and receive electronic payments within the flow of a conversation/messaging thread. Thus, the networking system can allow users to communicate about a payment transaction and conduct the transaction without having to open a separate application dedicated to electronic payments. The increased ease and efficiency of sending payments seamlessly during the exchange of messages provided by one or more embodiments of the networking system can lead to greater use of, and satisfaction with, electronic payments.

As used herein, the term "payment provider" refers to an entity that stores and/or handles payments or payment information for payment transactions. For example, a payment provider can include an entity that stores or maintains payment accounts or funds for users, such as, but not limited to, a bank, a credit/debit card issuer, an entity that manages stored value accounts, or a cash payment provider (e.g., for providing cash payments). Additionally, a payment provider can include a payment service that processes payment transactions between users by communicating with one or more entities that stores or maintains payment accounts or funds. Accordingly, a payment provider can allow users to register with a service for engaging in peer-to-peer or peer-to-business payment transactions with other users registered with the service.

As used herein, the terms "account" or "payment account" can refer to a user's debit card account, bank account, credit/debit card account, gift card, stored value account, or any other account from which money can be deducted or to which money can be deposited. The meanings of the above terms, as well as additional terms, will become more apparent in light of the disclosure below with respect to the figures.

As used herein, the terms "application programming interface" and "API" refer to a set of routines, programs, or tools that specifies how software components communicate with each other. Specifically, as described in more detail below, the networking system includes an API that includes a set of instructions and routines that allows payment providers to integrate with the networking system. The payment providers integrating with the networking system allows the networking system to send instructions to the payment providers in connection with payment transactions involving the payment providers. As used herein, the term "instruction" refers to an electronic communication including one or more commands that cause a device or system (e.g., a payment provider) to perform one or more operations defined within the command(s).

FIG. 1 is a schematic diagram illustrating an environment 100 that in which a networking system operates in accordance with one or more embodiments. An overview of the environment is described in relation to FIG. 1. Thereafter, a more detailed description of the components and processes of the networking system and other components within the environment are provided in relation to the remaining figures.

As illustrated by FIG. 1, the environment 100 includes a first user 102a and a second user 102b (collectively, "users 102a, 102b"), a sender client device 104a and a recipient client device 104b, server device(s) 106, a plurality of payment providers 108a, 108b, and a payment network 110. In one or more embodiments, as explained in greater detail below, the server device(s) 106 can include a networking system 114 (e.g., a social networking system) with which the users are registered.

As further illustrated by FIG. 1, the various components (i.e., the client devices 104a, 104b, the server device(s) 106, the payment providers 108a, 108b, and the payment network 110) can communicate with each other via a network 112. Specifically, the users 102a, 102b can use the corresponding client device(s) 104a, 104b to initiate payment transactions with each other by communicating with the server device(s) 106. Additionally, the server device(s) 106 can communicate with one or more of the payment providers 108a, 108b to cause the payment providers 108a, 108b to process payment transactions. In at least some implementations, the payment providers 108a, 108b can communicate with the payment network 110 to process the payment transaction. In alternative embodiments, the payment providers 108a, 108b can communicate directly with each other rather than through the payment network 100.

As used herein, a payment network 110 comprises a communications pathway across which payment transactions can be routed. For example, in one or more embodiments a payment network can comprise a payment gateway system, a card network system, and an issuer of a payment authorization number (e.g., issuer). As used herein, the term "payment gateway system" refers to software and servers that transmit transaction information to acquiring banks and responses from issuing banks (such as whether a transaction is approved or declined). Thus, a payment gateway system facilitates communication between banks. Furthermore, payment gateway implement Payment Card Industry Data Security Standard (PCI-DSS or PCI). Payment gateway systems help bridge communication protocols and provide security on behalf of a merchant. Payment gateway systems usually charge a per transaction fee. Some example of payment gateway systems include Braintree, Dwolla, Paypal, Authorize.net.

As used herein, the term "card network system" refers to an entity facilitates the payment process between credit card users, merchants, and issuers. Card network systems can also dictate where credit cards can be used, authorize credit card transactions, process transactions, and set terms of transactions. Some example of card network systems include VISA, MASTERCARD, AMERICAN EXPRESS, and DISCOVER.

As used herein, the term "issuer" refers to a financial institution (e.g., a bank) that issues credit cards to consumers and services their accounts. Issuers can also be a card network system or a payment gateway system. Some example of card network systems include CHASE, BANK OF AMERICA, WELLS FARGO, U.S. BANK, and CITIBANK.

As used herein, the term "payment authorization number" refers to a number that authorizes access to the corresponding payment account. For example, a payment authorization number can be a credit card number or debit card number.

In one or more embodiments, a networking system 114 on the server device(s) 106 facilitates the payment transactions by receiving requests to initiate payment transactions from users involving one or more of the payment providers 108a, 108b. As described in more detail herein, the networking system 114 implements an API that includes a set of routines for allowing the payment providers 108a, 108b to integrate with the networking system 114. After the payment providers 108a, 108b have integrated with the networking system 114, the networking system 114 can provide instructions to the payment providers 108a, 108b that cause the payment providers 108a, 108b to perform operations associated with payment transactions.

As described in more detail below, the networking system 114 can allow the users 102a, 102b to enter into a payment transaction even if the users 102a, 102b are associated with different payment providers. For example, for a payment transaction involving a first payment provider 108a and a second payment provider 108b, the networking system 114 can facilitate a payment transaction based on the API. To illustrate, the networking system 114 can cause the first payment provider 108a to communicate with the second payment provider 108b to process the payment transaction. Similarly, the networking system 114 can facilitate payment transactions for a recipient user that is not registered with or otherwise associated with a payment provider by instructing a payment provider to create a temporary account for the recipient user.

According to one or more embodiments, the users 102a, 102b use client applications 116a, 116b on the client devices 104a, 104b to communicate with the networking system 114 on the server device(s) 106 in connection with a payment transaction. For example, a first user 102a can use the client application 116a on a first client device ("sender client device 104a") to send a request to the networking system 114 to initiate a payment transaction with the second user 102b (e.g., a peer or a merchant/business). The networking system 114 can send information associated with the payment transaction for viewing by the second user 102b in the client application 116b on a second client device ("recipient client device 104b"). In at least some implementations, the second user 102b also accepts the payment transaction using the client application 116b on the recipient client device 104b.

Additionally, the server device(s) 106 and/or the payment providers 108a, 108b can communicate with the payment network 110 for processing payment transactions. For instance, payment transactions involving payment accounts that involve card issuers (e.g., credit/debit cards) can involve the payment network 110. As such, when facilitating such payment transactions, the networking system 114 can communicate with the payment providers 108a, 108b to cause the payment providers 108a, 108b to process the payment transactions via the payment network 110.

Although FIG. 1 illustrates an environment 100 with a specific configuration of components (e.g., client devices 104a, 104b, server device(s) 106, payment providers 108a, 108b, and a payment network 110 communicating via a network 112), other arrangements are possible. For example, the networking system 114 can be implemented in connection with any number of client devices, users, payment providers, and payment networks. Additionally, the components may include, or be implemented as part of, various types of computing devices, as described in more detail with reference to FIG. 10.

Figure 12:
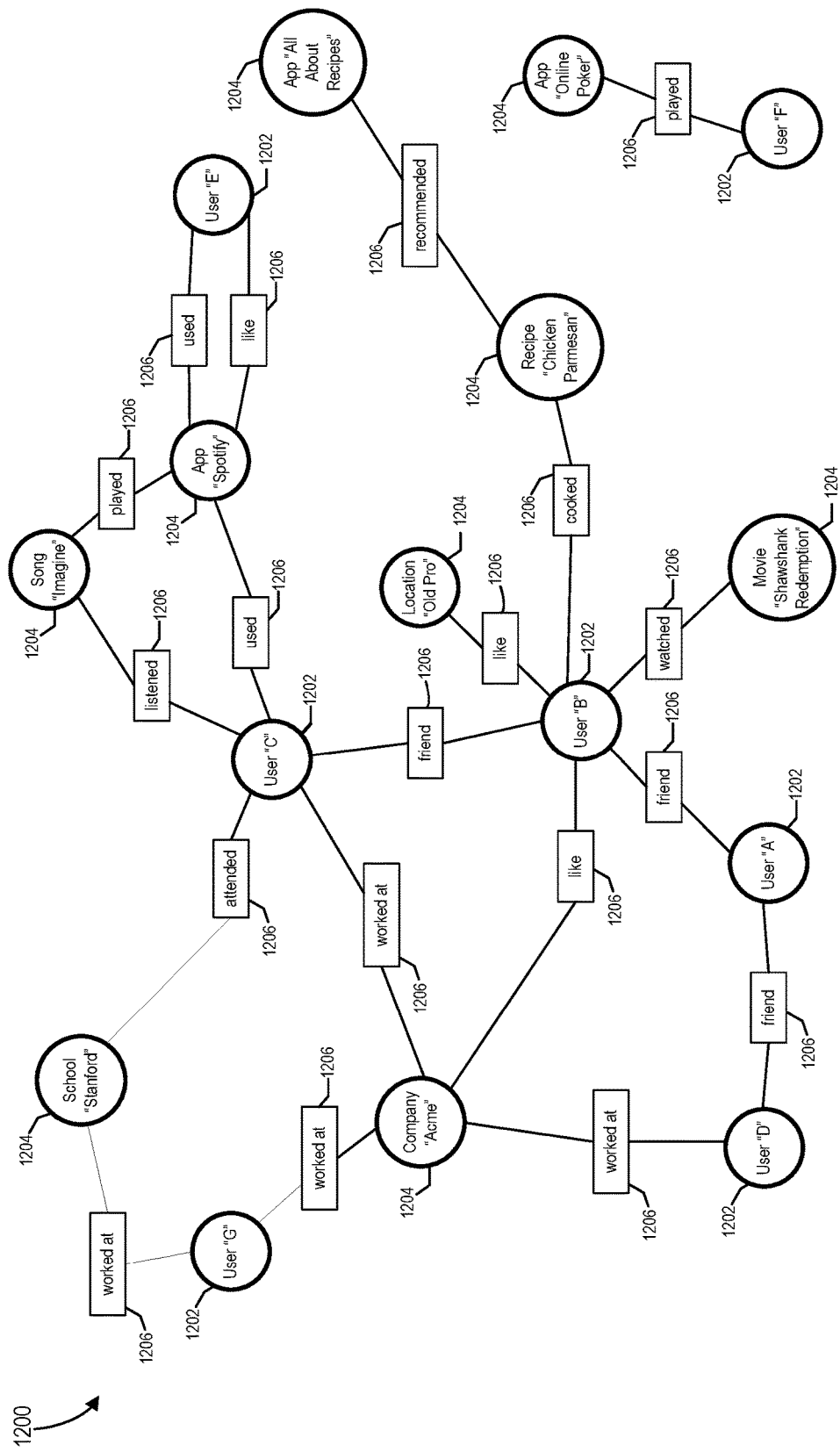
FIG. 12 illustrates an example social graph for a social networking system in accordance with one or more embodiments.

Furthermore, the networking system 114 can include, or be part of, a social networking system, such as is described in more detail with respect to FIG. 12. As such, the networking system 114 can allow users to communicate with each other, including sending electronic messages to each other and engaging in electronic payment transactions with each other. By allowing users to send and receive electronic messages and enter into electronic payments with each other, the networking system 114 provides a centralized system for users to communicate and interact with each other in a variety of ways using the client applications 116a, 116b. In alternative embodiments, the networking system 114 comprises a messaging system, an email system, or other system in which users can communicate with each other electronically.

As discussed, the systems and components discussed above with reference to FIG. 1 can allow users to easily, effectively, and securely engage in payment transactions via a networking system 114. FIGS. 2, 3A-3B, 4A-4B, and 5A-5B illustrate example process diagrams of one or more example embodiments of processes implemented by the networking system 114 discussed above. In particular, the illustrated process diagrams display a plurality of different types of payment transactions in which the networking system 114 provides instructions for processing the payment transactions according to the transaction types. Consistent with environment of FIG. 1, FIGS. 2-5B illustrate (according to a sequence flow of operations) various combinations and arrangements of a client devices, server device(s), payment providers, a payment network and a cash in location for performing various types of payment transactions.

Figure 2:
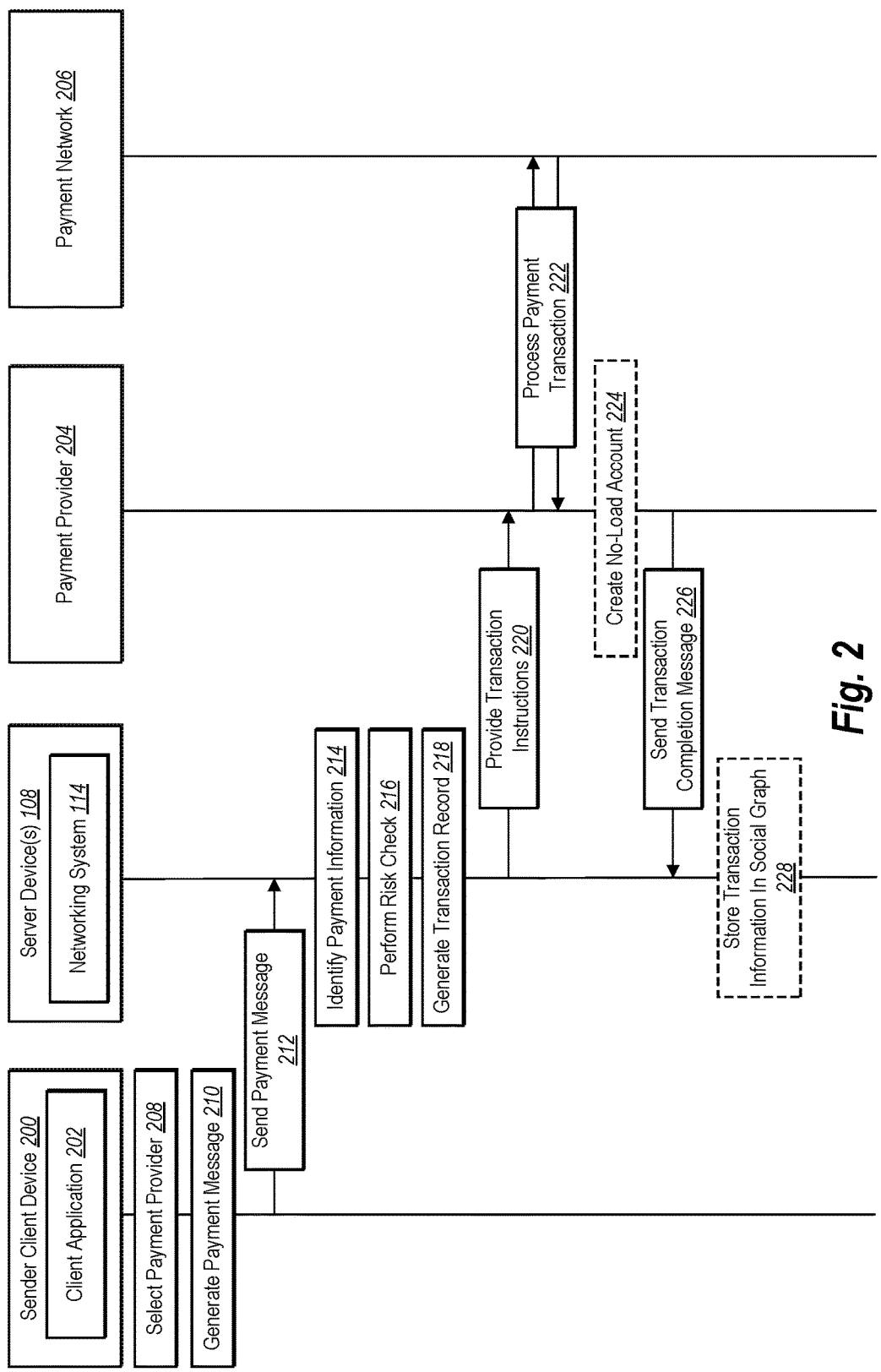
FIG. 2 illustrates a sequence-flow diagram illustrating interactions as part of a payment process between a sender and a recipient in accordance with one or more embodiments.

With reference now to FIG. 2, a process diagram includes a sender client device 200 including a client application 202, server device(s) 106 including the networking system 114, a payment provider 204, and a payment network 206. As illustrated in FIG. 2, the sender can select a payment provider 208 that uses a payment account via the payment network 206. For instance, the payment account can be a credit/debit card account with a card issuer. Accordingly, as described below, the networking system 114 facilitates the payment transaction in a way that causes the payment provider 204 to process the payment transaction by communicating with the payment network 206 to transfer funds from the sender's payment account.

As described in more detail with reference to FIG. 8, the networking system 114 can include a networking application and a payment engine for handling different types of information. Specifically, the network application can handle message information and the payment engine can handle secure information (e.g., payment transaction information). In one or more embodiments, the payment engine is PCI compliant and securely stores and transfers information. Accordingly, operations performed by the networking system 114 in FIGS. 2-5B can be performed by the network application or the payment engine based on the type of information being passed. Furthermore, the payment engine can store secure information such as payment account information.

In one or more embodiments, a process for a user ("sender") transferring funds to a co-user ("recipient") begins with the sender selecting 208 a payment provider using the client application 202 of the sender client device 200. For example, the sender can select the payment provider by entering information associated with the payment provider for processing the payment transaction. To illustrate, the sender can verify payment account information corresponding to the payment provider. Alternatively, the sender can select the payment provider by selecting from one or more previously entered payment providers.

In response to the user selecting the payment provider, or in response to the user requesting to initiate a payment transaction with the recipient, the sender client device 200 generates 210 a payment message. The payment message can include payment information for the payment transaction including, but not limited to, payment account information, payment provider information, user information (e.g., payment account information for the sender and/or recipient), and a payment amount. The sender client device 200 then sends 212 the payment message to the networking system 114 on the server device(s) 106.

In one or more embodiments, the sender uses a third-party service that communicates with the networking system 114 for processing payment transactions with other users. The third-party service can include a third-party application that communicates with the client application and/or the networking system in connection with the payment transactions. For instance, the sender client device 200 can send the payment message to the third-party service, which then sends the payment message to the networking system 114. As described below, the networking system 114 facilitates payment transactions using the third-party service even if the third-party service is not compliant with specific industry standards. In such instances, the networking system 114 can store encrypted payment account information for the sender and provide a key identifier (e.g., further encrypted representation of the encrypted payment account information) for communicating with the third-party service.

In one or more embodiments, the third-party system comprises a messaging application, a photo-sharing application, or other systems that has users that communicate electronically with each other. The third-party system may not be PCI compliant or otherwise sophisticated enough to allow its users to enter into payment transactions. The networking application 114 can provide APIs that allow the third-party system to integrate with the networking system 114 to allow users of the third-party system to send payments to each other.

In response to receiving the payment message from the sender client device 200, the networking system 114 identifies 214 payment information for the requested payment transaction. As mentioned, the payment message can include payment information, such that the networking system 114 can identify at least some of the payment information from the payment message. For instance, the networking system 114 can identify the type of payment transaction from the payment message to determine how to facilitate the payment transaction (e.g., by determining that the transaction type involves a credit/debit card transfer). In one or more implementations, the networking system 114 can also identify payment information based on a device identifier for the sender client device 200. In another example, the networking system 114 may identify the user requesting the payment transaction based on a payment account identifier.

According to one or more embodiments, the networking system 114 also performs 216 a risk check to determine whether the payment transaction is fraudulent. As described in more detail with respect to FIG. 8, the networking system 114 can determine whether the sender/recipient is a fraudster based on information associated with the sender/recipient. The networking system 114 can determine the likelihood of fraudulent activity based on activity or information associated with the sender/recipient in connection with the networking system 114 (e.g., information from a social graph). If the networking system 114 determines that the payment transaction is fraudulent (e.g., the sender or recipient is a fraudster), the networking system can cancel the payment transaction. Although FIG. 2 illustrates the risk check at a certain point in the process, the networking system 114 can perform one or more risk checks at any time during the payment transaction process.

The networking system 114 also generates 218 a transaction record for the payment transaction. Specifically, the networking system 114 generates a record that includes at least some of the payment information, as well as other information associated with the request to engage in the payment transaction. For example, the record can include a database entry that includes, but is not limited to, transaction ID(s), payment provider ID(s), payment account ID(s), security information for the payment account, transaction identifier, type of transaction, status of the transaction, payment amount, currency, creation time, or other information associated with the payment transaction and/or transaction record. The record can also include additional information that the networking system 114 communicates to the payment provider 204 to instruct the payment provider 204 to process the payment transaction.

The networking system 114 can alternatively generate separate transaction records for maintaining a history of transactions and states of the transaction (e.g., granular detail associated with the current statuses of the transactions). To illustrate, the networking system 114 can generate a table that includes high level details of the payment transaction and overall status of the transfer; a table that stores the payment transactions received for a specific user; a table that includes separate rows for a sender and a recipient, with each row being updated during the life cycle of the transaction; a table that contains the latest data for only those fields of a transaction that can change; and a table that contains attribute data that pertains to a sender or recipient portion of a transaction and is applicable to specific scenarios (e.g., a reason for canceling or refunding a transaction, a URL for instructions from a provider to a sender or recipient). Thus, for a given transaction, the networking system 114 can generate a plurality of tables for the payment transaction and store one or more of the tables with information about the recipient and one or more of the tables with information about the sender (e.g., in a social graph).

Before, after, or simultaneously with generating the transaction record, the networking system 114 provides 220 transaction instructions to the payment provider 204. In particular, the networking system 114 uses the transaction information (i.e., the information the networking system 114 stores in the transaction record) to determine one or more instructions for processing the payment transaction. For instance, the networking system 114 can determine instructions to send to the payment provider 204 to cause the payment provider 204 to process the payment transaction by communicating with the payment network 206. In at least some embodiments, the networking system 114 provides the instructions to the payment provider 204 in a single communication. In alternative embodiments, the networking system provides the instructions to the payment provider 204 in a plurality of separate communications with the payment provider 204. In either case, the networking system 114 sends instructions that causes the payment provider 204 to perform the various operations associated with initiating and completing the payment transaction.

In one or more embodiments, the transaction instructions comprise a request identifier, a client identifier, a network system specific transfer identifier, a currency, an amount, a fee if any, sender payment data (e.g., a payment credential such as a payment card number, an expiration of the payment card, a security code such as a CVV, and a name of the payment card), receiver payout data (e.g., a recipient payment provider and account ID or a payment credential), and optionally routing instructions for sending the payment to the recipient payment provider).

Furthermore, by providing instructions to the payment provider 204, the networking system 114 facilitates the payment transaction without handling funds from the payment transaction. Rather, the payment provider 204 and/or the payment network 206 handle the funds associated with the payment transaction based on the instructions that the networking system 114 provides. Accordingly, the networking system 114 uses the instructions to act as a facilitator for payment transactions without maintaining payment accounts or funds for users involved in payment accounts. In other words, the network system 114 is not the merchant of record on the transaction.

In response to receiving the instructions from the networking system 114, the payment provider 204 performs one or more operations based on the instructions from the networking system 114. In the embodiment illustrated in FIG. 2, the instructions cause the payment provider 204 to communicate with the payment network 206 to process 222 the payment transaction. For instance, the payment provider 204 can provide the payment information to the payment network 206 to allow the payment network to transfer funds from the payment account of the sender to a payment account of the recipient (e.g., from a debit card of the sender to a debit card of the recipient).

Optionally, if the payment account of the recipient is not known at the time of the payment transaction (e.g., if the recipient has not registered with the payment provider 204), the payment network 206 can transfer the funds to the payment provider 204. The payment provider 204 can create 224 a "no-load" account associated with the recipient based on the instructions provided to the payment provider 204 from the networking system 114. Specifically, the no-load account can include a temporary account that stores only the funds transferred from the sender's payment account, such that the recipient is able to access the funds, but may not be able to transfer any additional funds into the account. Alternatively, the networking system 114 can use a separate payment provider for creating the no-load account. To illustrate, the networking system 114 can establish a contractual relationship with a specific payment provider for handling funds for payment transactions in which one or more recipients are not registered with a payment provider.

In one or more embodiments, after processing the payment transaction, the payment provider 204 sends 226 a transaction status message to the networking system 114 indicating the status of the payment transaction (e.g., complete, pending, failed). The transaction status message can include the request identifier included in the transaction instructions as well as a provider specific reference number. The request identifier can allow the networking system 114 to link the status message to the proper transaction. As a specific example of a status message, the payment provider 204 can notify the networking system 114 that the payment transaction was successful. To illustrate, the transaction completion message can include a signal that the payment transaction is complete, and the networking system 114 can note the completion of the payment transaction in the transaction record. Additionally, the transaction completion message can include information indicating that the payment network transferred funds (or otherwise funded the payment transaction) from the payment account of the sender to a payment account of the recipient (e.g., the no-load account).

Optionally, the networking system 114 can then store 228 the transaction information in a social graph. In particular, the networking system 114 can store at least some of the information from the transaction record in the social graph to reflect the interactions between the sender and the recipient. In one example, the networking system 114 stores the transaction record itself in one or more nodes of the social graph. Storing the information in the social graph may allow the networking system 114 to provide faster payment transactions in the future (e.g., by reducing the amount of time associated with risk checks). Alternatively, rather than storing the transaction record in the social graph, the networking system 114 can store the transaction record in a database of financial transactions between users of the networking system 114.

Figure 3A:
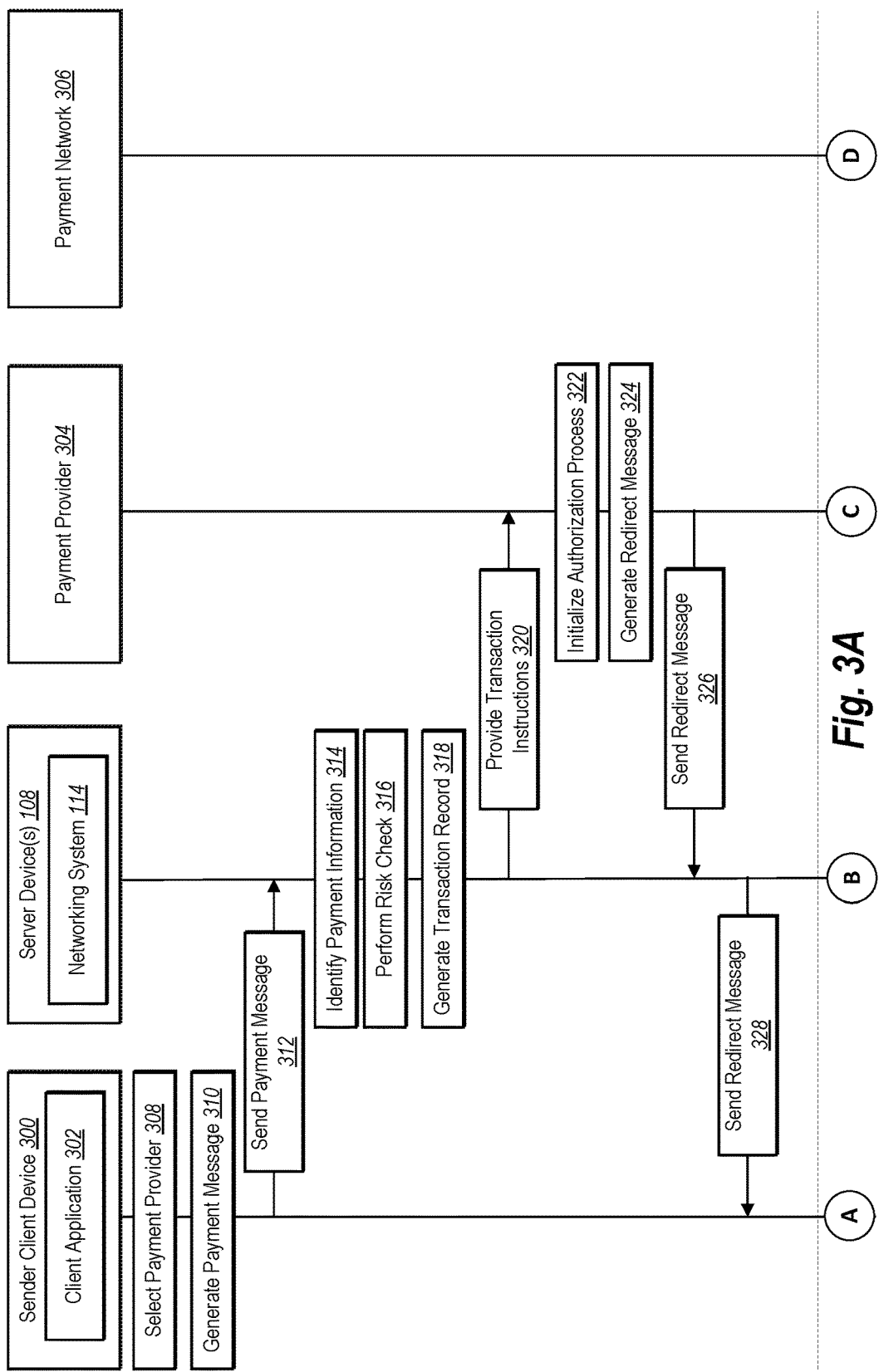
FIGS. 3A-3B illustrate a sequence-flow diagram illustrating interactions as part of a payment process between a sender and a recipient in accordance with one or more embodiments.
Figure 3B:
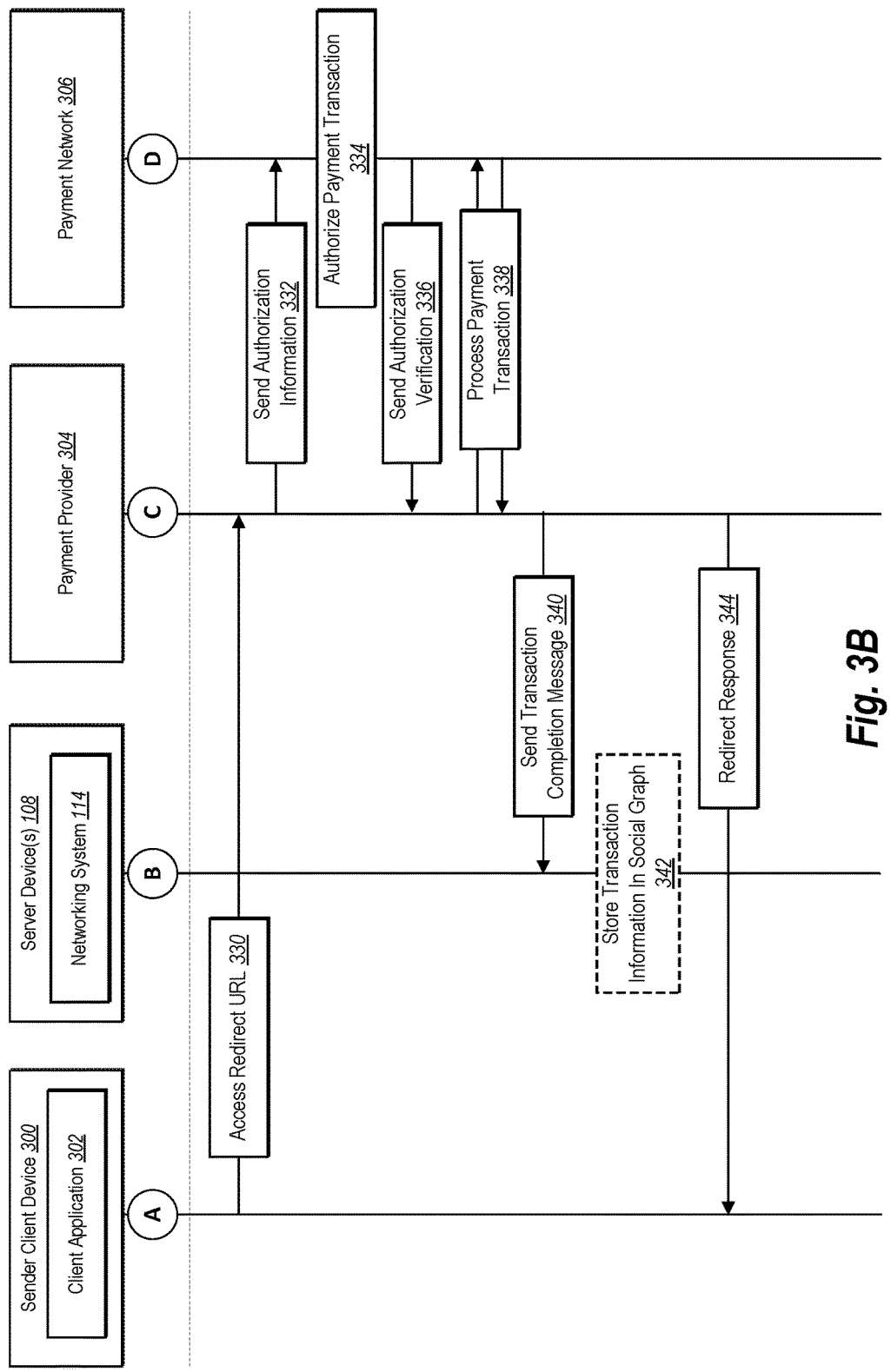

Similar to FIG. 2, FIGS. 3A-3B illustrate a payment transaction involving a payment account such as a credit/debit card account. Furthermore, the payment transaction involves a secure transaction that involves an additional security layer. Specifically, FIGS. 3A-3B illustrate a sender client device 300 including a client application 302, server device(s) 106 including the networking system 114, a payment provider 304, and a payment network 306. Accordingly, the networking system 114 facilitates the payment transaction by causing the payment provider 304 to communicate with the payment network 306 to transfer funds from the sender's payment account in a secure transaction process (e.g., 3-D Secure).

In one or more embodiments, a process for a sender transferring funds to a recipient begins with the sender selecting 308 a payment provider using the client application 302 of the sender client device 300. As described previously, the sender can enter information identifying the payment provider or select from one or more previously entered payment providers or payment methods. The sender client device 300 then generates 310 a payment message including information for the payment transaction and sends 312 the payment message to the networking system 114.

The networking system 114 uses the payment message to identify 314 payment information for the payment transaction. In particular, the networking system 114 can identify the type of payment transaction from the payment message to determine how to facilitate the payment transaction. For instance, the networking system 114 can determine that the transaction type involves a credit/debit card transfer. The networking system also identifies other payment information for facilitating the payment transaction, including payment account information, user information, and payment providers involved in the payment transaction.

The networking system 114 uses the payment information to perform a risk check 316 for the payment transaction. If the networking system 114 determines that the payment transaction is not fraudulent (e.g., a risk level of the payment transaction is low), the networking system 114 determines that the payment transaction passes the risk check and continues facilitating the payment transaction. If the networking system 114 determines that the payment transaction is fraudulent (e.g., the risk level of the payment transaction is high), the networking system 114 cancels the payment transaction.

After determining the risk of the payment transaction, the networking system 114 generates 318 a transaction record for the payment transaction. According to one or more embodiments, the transaction record can include the payment information in the payment message and/or additional information associated with the payment transaction. The networking system 114 can then store the transaction record in a database that allows the networking system 114 to maintain a history of payment transactions involving the sender and/or recipient.

Before, after, or simultaneously with generating the transaction record, the networking system 114 provides 320 transaction instructions to the payment provider 304. Specifically, the networking system 114 uses transaction information associated with the payment transaction to determine one or more instructions for processing the payment transaction. To illustrate, the networking system 114 determines instructions to send to the payment provider 304 to cause the payment provider 304 to process the payment transaction by communicating with the payment network 306. By determining the instructions based on the transaction information, the networking system 114 causes the payment provider 304 to process the payment transaction according to the requested payment transaction type.

In one or more embodiments, the transaction instructions comprise a request identifier, a client identifier, a network system specific transfer identifier, a currency, an amount, a fee if any, sender payment data (e.g., a payment credential such as a payment card number, an expiration of the payment card, a security code such as a CVV, and a name of the payment card), receiver payout data (e.g., a recipient payment provider and account ID or a payment credential), and optionally routing instructions for sending the payment to the recipient payment provider).

In response to receiving the instructions from the networking system 114, the payment provider 304 performs operation(s) based on the received instructions. As illustrated in FIG. 3A, the payment provider 304 determines that the payment transaction is associated with an authorization process. The payment provider 304 then initializes 322 the authorization process for the payment transaction. For example, the payment provider 304 can identify the type of authorization based on the instructions received from the networking system 114, the payment credential being used, or the payment provider.

The payment provider 304 can then generate 324 a redirect message for sending to the networking system 114. Specifically, the redirect message includes a redirect URL or other redirect command that indicates a location for authorizing the payment transaction. In one or more embodiments, the payment provider 304 obtains the redirect URL from a lookup table that includes the redirect URL for redirecting the client application 302 of the sender client device 300 to the payment provider 304, as described in more detail below. Alternatively, the payment provider 304 can send a request to the payment network 306 for the redirect URL, and the payment network 306 can return the redirect URL to the payment provider 304.

Once the payment provider 304 determines the redirect URL and generates the redirect message, the payment provider 304 sends 326 the redirect message to the networking system 114 in accordance with the instructions from the networking system 114. The networking system 114 receives the redirect message and then sends 328 the redirect message to the sender client device 300. The sender client device 300 accesses 330 the redirect URL using the client application 302, which includes a redirection instruction that causes the client application 302 to be directed to the payment provider 304.

When accessing the redirect URL, the client application 302 sends a request to the payment provider 304 to authorize the payment transaction. To illustrate, the request to the payment provider 304 can be a request (e.g., an HTTP POST request) that includes authorization information for authorizing the client device and/or the user for processing the payment transaction. For instance, the user can enter the authorization information into the client application 302 to verify the user's identity and/or credentials. In one or more embodiments, the authorization information includes a password or a personal identification number.

Once the payment provider 304 receives the request, the payment provider 304 sends 332 the authorization information to the payment network 306 for authorizing the payment transaction. Alternatively, the redirect message includes a plurality of redirect URLs for redirecting the client application 302 to the payment provider 304 and the payment network 306. In yet another example, the payment provider 304 redirects the client application 302 in response to the client application 302 accessing the redirect URL to the payment provider 304. The payment network 306 authorizes 334 the payment transaction using the provide authorization information. In other words, the payment network 306 verifies the identity of the user and that the client device 300 is authorized to perform payment transactions for the user and sends 336 an authorization verification to the payment provider 304.

In response to receiving the authorization verification response from the payment network 306, the payment provider 304 performs one or more operations based on the instructions from the networking system 114. As illustrated, the instructions cause the payment provider 304 to communicate with the payment network 306 to process 338 the payment transaction with the payment network 306. For instance, the payment provider 304 can provide the payment information to the payment network 306 to allow the payment network to transfer funds from the payment account of the sender to a payment account of the recipient (e.g., from a debit/credit card of the sender to a payment account of the recipient).

After processing the payment transaction, the payment provider 304 sends 340 a transaction completion message to the networking system 114 indicating that the payment transaction is complete. For example, the payment provider 304 can notify the networking system 114 that the payment transaction was successful. To illustrate, the transaction completion message can include a signal that the payment transaction is complete, and the networking system 114 can note the completion of the payment transaction in the transaction record. Additionally, the transaction completion message can include information indicating that the payment network transferred funds (or otherwise funded the payment transaction) from the payment account of the sender to a payment account of the recipient.

Optionally, the networking system 114 can then store 342 the transaction information in a social graph. In particular, the networking system 114 can store at least some of the information from the transaction record in the social graph to reflect the interactions between the sender and the recipient. In one example, the networking system 114 stores the transaction record itself in one or more nodes of the social graph. Alternatively, rather than storing the transaction record in the social graph, the networking system 114 can store the transaction record in a database of financial transactions between users of the networking system 114.

Before, after, or at the same time as the payment provider 304 sends the transaction completion message to the networking system 114, the payment provider 304 can also send 344 a redirect response to the client application 302 on the sender client device 300. Specifically, the redirect response can return the client application 302 to a payment completion message to allow the client application 302 to verify that the payment transaction is complete. Alternatively, the redirect response can return the client application 302 to a messaging graphical user interface, as described in more detail below, within which the user initiates payment transactions.

Figure 4A:
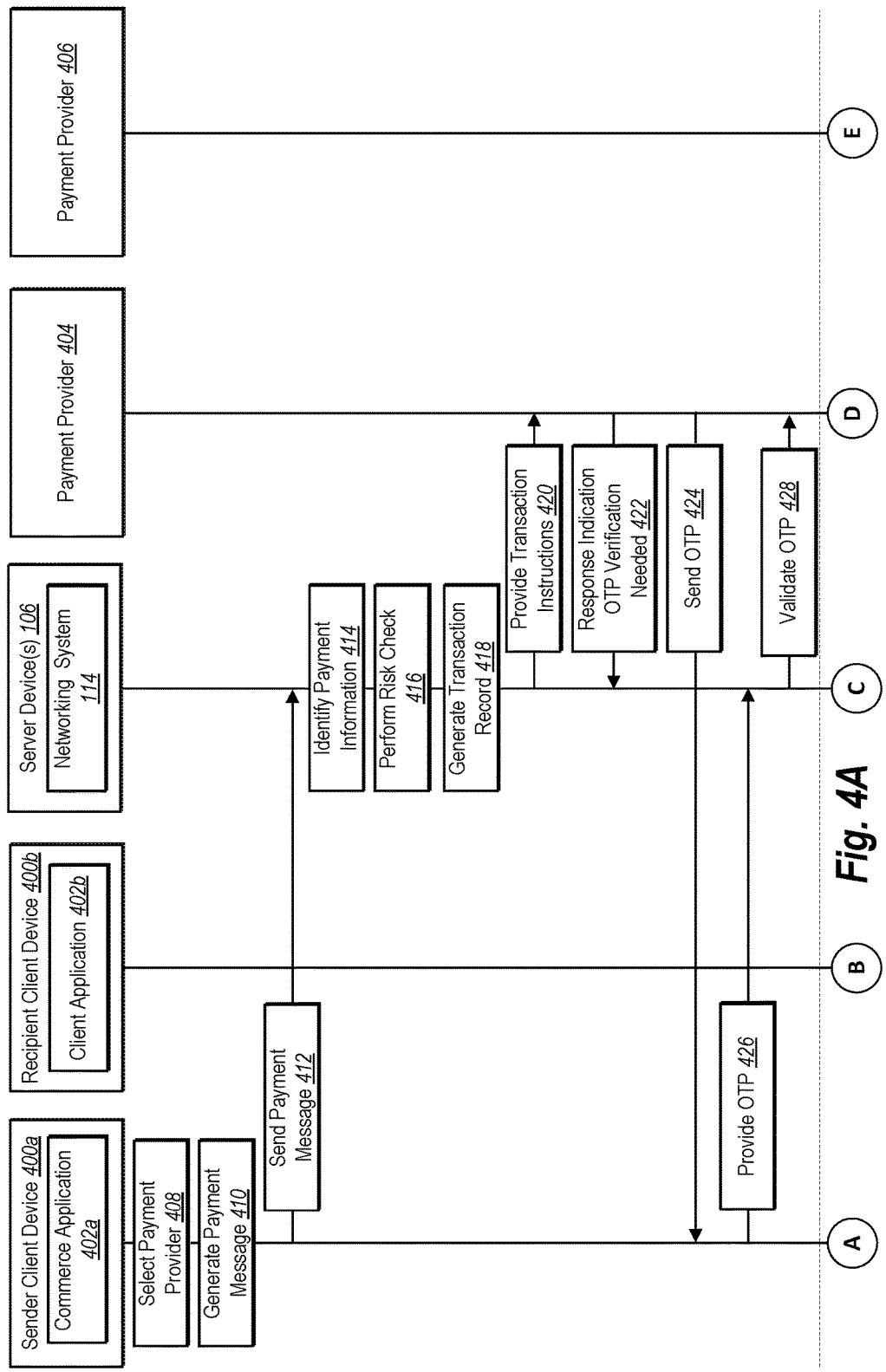
FIGS. 4A-4B illustrate a sequence-flow diagram illustrating interactions as part of a payment process between a sender and a recipient in accordance with one or more embodiments.
Figure 4B:
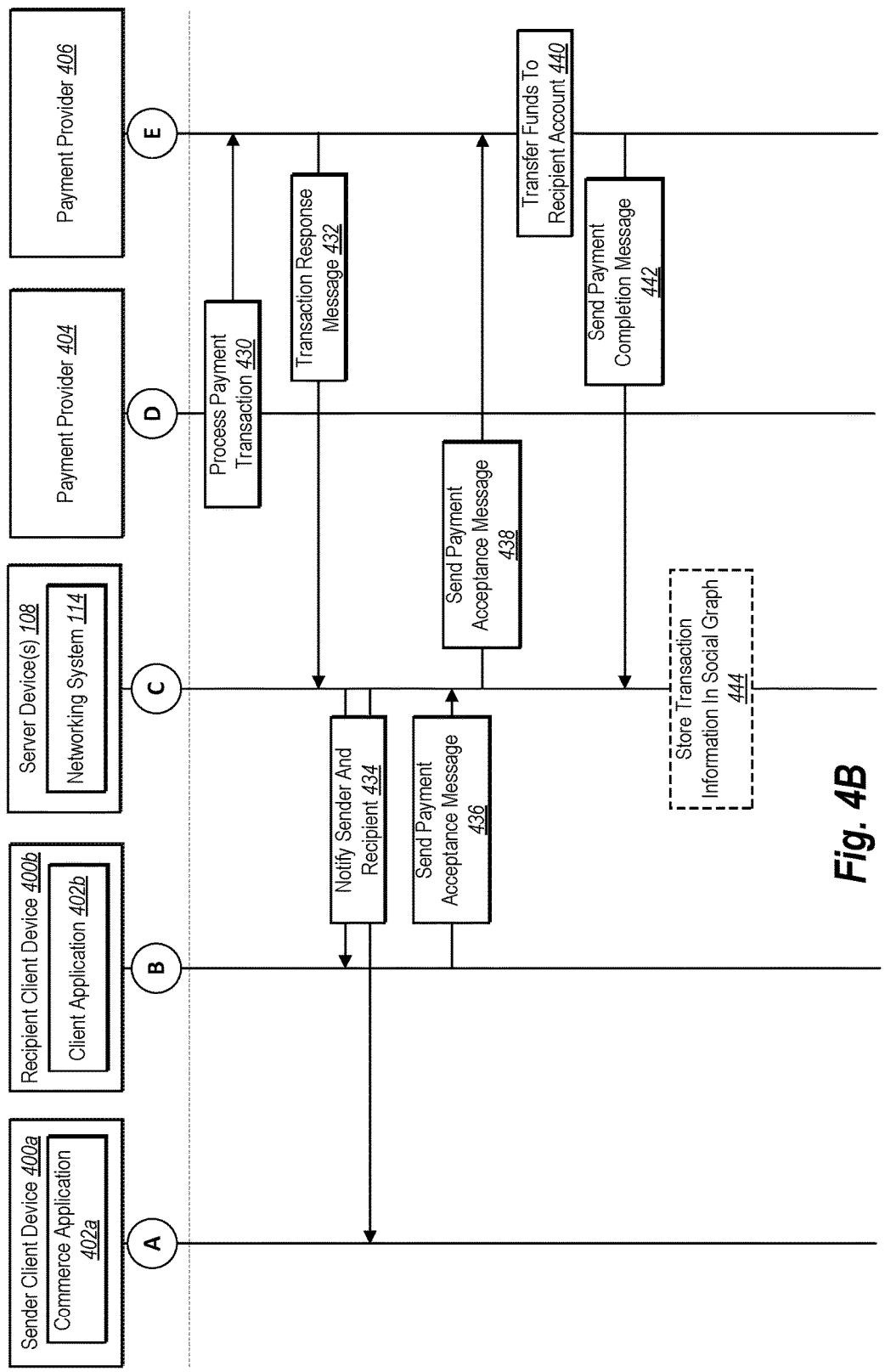

Although FIGS. 2 and 3A-3B illustrate processes for performing a payment transaction using payment networks 206, 306, the networking system 114 can also facilitate payment transactions involving a plurality of payment providers. In particular, FIGS. 4A-4B illustrate a payment transaction involving a sender client device 400a and a recipient client device 400b, each including a client application 402a, 402b; server device(s) 106 including the networking system 114; a first payment provider 404; and a second payment provider 406. As shown, a user ("sender") of the sender client device 400a has a payment account with the first payment provider 404. Additionally, a user ("recipient") of the recipient client device 400b has a payment account with the second payment provider 406. Alternatively, the sender and the recipient may use the same payment provider (e.g., first payment provider 404).

In one or more embodiments, the payment account of the sender includes a stored value account. For instance, the stored value account is an account in which a monetary value is stored on a card (e.g., a gift card or prepaid card) held by the sender, rather than in an account maintained by the first payment provider 404. As such, the card associated with the stored value account stores the monetary value within an electronic chip on the card, and payment transactions involving the stored value account do not require the use of a payment network to process the payment transaction. Furthermore, such payment transactions can occur without complying with certain industry standards. Alternatively, the payment account can include a digital wallet in which a user stores funds for payment transactions.

According to one or more embodiments, a process for a sender transferring funds from a stored value account to a recipient begins with the sender selecting 408 a payment provider using the client application 402a of the sender client device 400a. For example, the sender can select the first payment provider 404 by selecting a stored value account as a method of payment. The stored value account can be associated with a specific payment provider. The sender client device 400a then generates 410 a payment message including information for the payment transaction and sends 412 the payment message to the networking system 114.

The networking system 114 uses the payment message to identify 414 payment information for the payment transaction. Specifically, the networking system 114 can identify the type of payment transaction from the payment message to determine how to facilitate the payment transaction. For instance, the networking system 114 can determine that the transaction type involves a stored value account of the sender. The networking system can also identify other payment information for facilitating the payment transaction, including payment account information for the recipient, user information, and payment providers involved in the payment transaction.

The networking system 114 uses the payment information to perform a risk check 416 for the payment transaction. If the networking system 114 determines that the payment transaction is not fraudulent (e.g., a risk level of the payment transaction is low), the networking system 114 determines that the payment transaction passes the risk check and continues facilitating the payment transaction. If the networking system 114 determines that the payment transaction is fraudulent (e.g., the risk level of the payment transaction is high), the networking system 114 cancels the payment transaction.

The networking system 114 then generates 418 a transaction record for the payment transaction. According to one or more embodiments, the transaction record can include the payment information in the payment message and/or additional information associated with the payment transaction. The networking system 114 can then store the transaction record in a database that allows the networking system 114 to maintain a history of payment transactions involving the sender and/or recipient.

Before, after, or simultaneously with generating the transaction record, the networking system 114 provides 420 transaction instructions to the first payment provider 404. Specifically, the networking system 114 uses transaction information associated with the payment transaction to determine one or more instructions for processing the payment transaction. To illustrate, the networking system 114 determines instructions to send to the first payment provider 404 to cause the first payment provider 404 to process the payment transaction by communicating with the second payment provider 406. For example, the instructions include one or more commands for processing the payment transaction using a stored value account of the sender. By determining the instructions based on the transaction information, the networking system 114 causes the first payment provider 404 to process the payment transaction according to the requested payment transaction type.

For example, in one or more embodiments, the transaction instructions comprise a request identifier, a client identifier, a network system specific transfer identifier, a currency, an amount, a fee if any, sender payment data (e.g., a payment type (wallet), a provider account identifier, a provider type, a credential identifier, and an access token), receiver payout data (e.g., a payment type (wallet), a provider account identifier, a provider type, and a credential identifier), and optionally routing instructions for sending the payment to the recipient payment provider).

As the request for the payment transaction comes from the networking system 114, the payment provider can require that networking system 114 authenticate or otherwise verify that the transaction was requested by the user/owner of the account associated with the account identifier in the transaction instructions 420. As such, the payment provider 404 can require that the transaction instructions 420 include an access token associated with the account associated with the account identifier. The access token can allow the networking system 114 to make requests on behalf of the user/owner of the account associated with the account identifier.

In response to receiving the instructions from the networking system 114, the first payment provider 404 performs operation(s) based on the received instructions. As illustrated in FIG. 4A, the first payment provider 404 determines that the payment account of the sender is associated with an authorization process. To illustrate, the first payment provider 404 can determine that the authorization process requires a one-time password that is usable for a single payment transaction. For example, the one-time password can provide a layer of security to prevent the use of the stored payment account by an unauthorized user.

Accordingly, the first payment provider 404 can generate and/or otherwise obtain the one-time password for use with the current payment transaction. The first payment provider 404 can then send 422 a response to the networking system 114 indicating that one-time password verification is needed for the payment transaction. The first payment provider 404 also sends 424 the one-time password to the sender client device 400a. For instance, the first payment provider 404 can provide the one-time password in a text message, an email message, or other electronic delivery method that allows the sender to quickly identify the one-time password.

In response to receiving the one-time password, the sender can enter the one-time password (e.g., into the client application 402a), causing the sender client device 400a to provide 426 the one-time password to the networking system 114 to authorize the payment transaction. The networking system 114 validates 428 the one-time password received from the sender client device 400a by sending the one-time password to the first payment provider 404. The first payment provider 404 can verify that the received one-time password matches the one-time password that the first payment provider 404 sent to the sender client device 400a. Additionally, the first payment provider 404 can set an expiration for the one-time password, such that if the first payment provider 404 does not receive the one-time password within the allotted time, the one-time password expires, and the payment transaction fails.

After authorizing the payment transaction, the first payment provider 404 can process 430 the payment transaction with the second payment provider 406. For instance, the first payment provider 404 can perform one or more commands in the instructions previously received from the networking system 114. The instructions can cause the first payment provider 404 to identify the second payment provider 406 and then transfer funds from the sender's payment account to the second payment provider 406.

In at least some implementations, the second payment provider 406 stores the transferred funds in a temporary account until acceptance by the recipient, as described below. Alternatively, the first payment provider 404 can store the transferred funds or hold the funds for transfer to a payment account if the recipient payment account is unknown, or if the recipient has not accepted the payment transaction. Additionally, although FIGS. 4A-4B illustrate a plurality of payment providers, the payment transaction may involve only one payment provider, such that both the first payment provider 404 handles the funds of the payment transaction for both the sender and the recipient.

After, or during, processing the payment transaction, the first payment provider can send 432 a transaction response message to networking system 114 indicating that the payment transaction is processing. If the recipient has not accepted the payment transaction, the transaction response message can include such an indication. The networking system 114 can then notify 434 the sender and the recipient of the payment transaction by sending a message to each of the sender client device 400a and the recipient client device 400b. The client applications 402a, 402b can display the message at the corresponding client device 400a, 400b.

If the payment transaction requests an acceptance by the recipient, the recipient can enter the acceptance into the client application 402b at the recipient client device 400b. The recipient client device 400b can then send 436 the payment acceptance message to the networking system. The networking system 114 can also send 438 the payment acceptance message to the second payment provider 406. Upon receipt of the acceptance, the second payment provider 406 can transfer 440 the funds to the recipient account from the temporary account. Alternatively, the second payment provider 406 can request that the first payment provider 404 complete the transaction by transferring the funds from the sender's payment account to the recipient's payment account.

The second payment provider 406 can then send 442 a payment completion message to the networking system 114 indicating that the payment transaction is complete. For instance, if the recipient accepted payment, and the payment transaction was successful, the payment completion message can indicate that the payment transaction was successful. Otherwise, the payment completion message can indicate that the payment transaction was cancelled or failed for some other reason. As noted previously, the networking system 114 can then optionally store 444 the transaction information in the social graph.

Figure 5A:
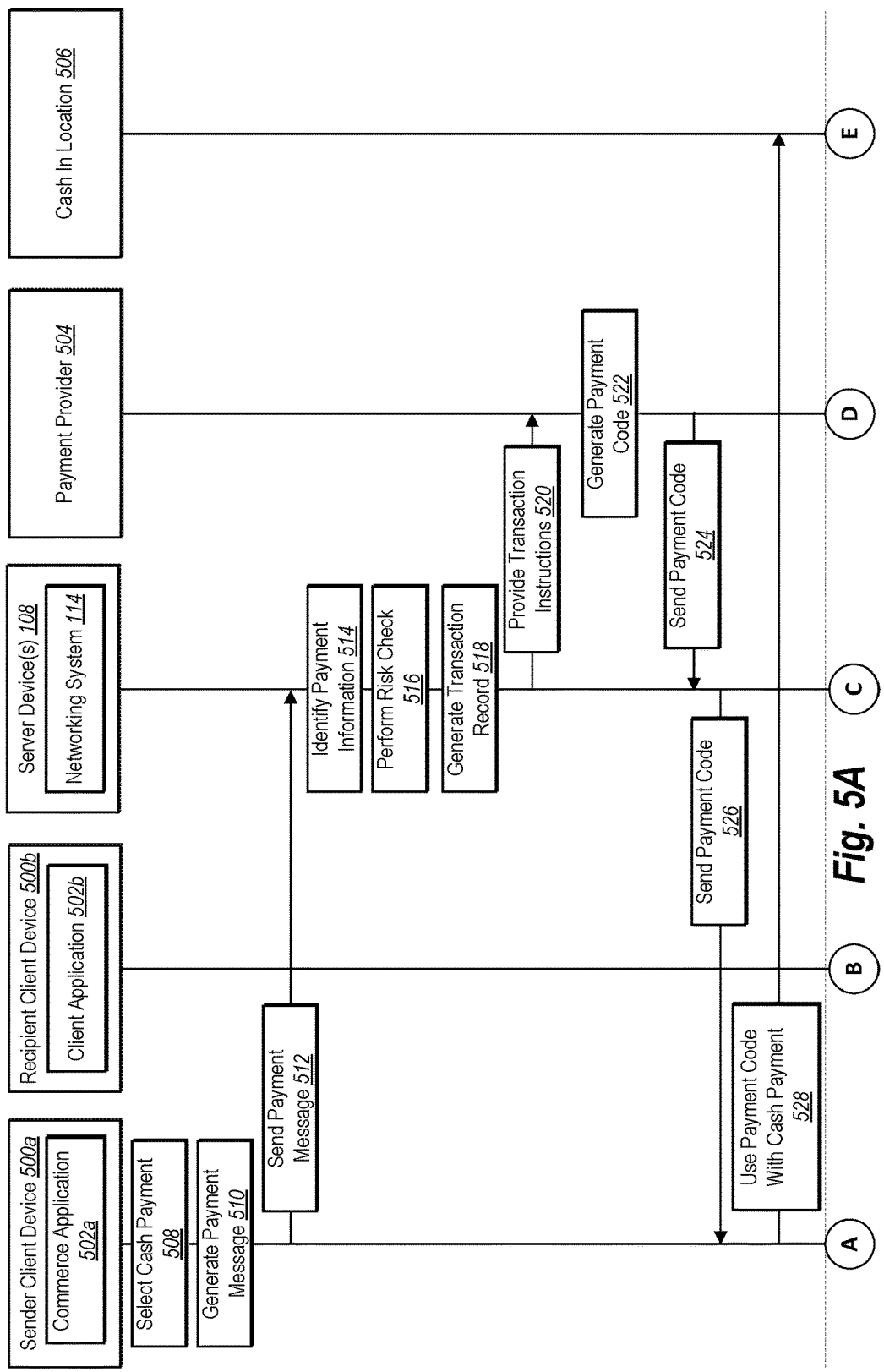
FIGS. 5A-5B illustrate a sequence-flow diagram illustrating interactions as part of a payment process between a sender and a recipient in accordance with one or more embodiments.
Figure 5B:
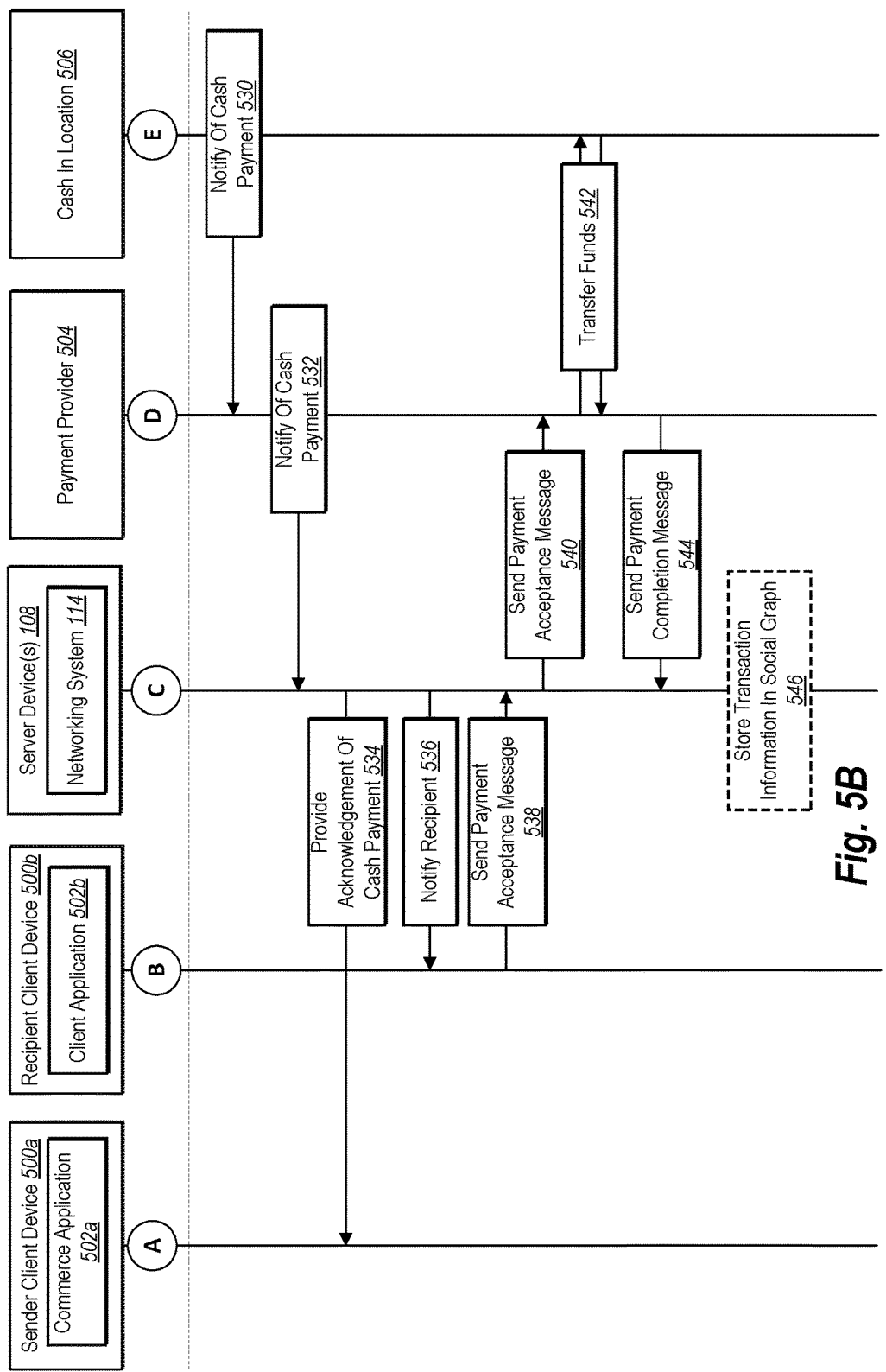

FIGS. 2-4B illustrate methods of fully electronic payment transactions. As described below, the networking system 114 can also facilitate payment transactions that involve cash payments or cash withdrawals. As illustrated, FIGS. 5A-5B include a sender client device 500a and a recipient client device 500b, each including a client application 502a, 502b; server device(s) 106 including the networking system 114; a payment provider 504; and a cash in location 506. Specifically, FIGS. 5A-5B illustrate a payment transaction involving a cash payment that the user ("sender") of the sender client device 500a funds using a cash payment.

In one or more embodiments, the sender uses the client application 502a of the sender client device 500a to initiate a payment transaction with another user ("recipient") of the recipient client device 500b. In particular, the process for a sender funding a payment transaction using a cash payment involves selecting 508 a cash payment as the payment method. For example, the sender can initiate the payment transaction by selecting a cash payment within the client application 502a. To illustrate, the client application 502a can provide a plurality of different payment methods to the sender, and the sender can select the cash payment from the plurality of different payment methods. A cash payment to fund an electronic payment transaction can involve submitting the cash payment in connection with a payment provider 504 associated with the networking system 114, as described in more detail below.

After the sender selects the payment method, the sender client device 500a can generate 510 a payment message including payment information. The payment information can include a payment amount associated with the cash payment, as well as other information for performing the payment transaction. For example, the payment message can include a location of the sender client device 500a. The sender client device 500a then sends 512 the payment message to the networking system 114.

The networking system 114 then identifies 514 payment information for the payment transaction based on the payment message. Specifically, the networking system can determine the sender, the recipient, and the payment amount. Additionally, the networking system 114 can identify the type of payment transaction as a payment transaction funded by a cash payment. Accordingly, the networking system 114 can determine how to facilitate the payment transaction between the sender and the recipient based on the identified payment information.

The networking system 114 can also identify the location of the sender to provide recommendations of locations for making the cash payment. For example, the networking system 114 can identify the location of the sender based on the location of the sender client device 500a from the payment message. The networking system 114 can then determine one or more cash in locations near the location of the sender. A cash in location can include any location that accepts cash payment for funding an electronic payment transaction, such as a bank or store associated with the networking system 114. In one or more implementations, cash in locations can become associated with the networking system 114 using the API that the networking system 114 provides.

As described previously, the networking system 114 uses the payment information to perform a risk check 516 for payment transactions. If the networking system 114 determines that the payment transaction is not fraudulent (e.g., a risk level of the payment transaction is low), the networking system 114 determines that the payment transaction passes the risk check and continues facilitating the payment transaction. If the networking system 114 determines that the payment transaction is fraudulent (e.g., the risk level of the payment transaction is high), the networking system 114 cancels the payment transaction.

The networking system 114 generates 518 a transaction record for the payment transaction. According to one or more embodiments, the transaction record can include the payment information in the payment message and/or additional information associated with the payment transaction. To illustrate, the networking system 114 can include the payment type (e.g., cash payment). The networking system 114 can then store the transaction record in a database that allows the networking system 114 to maintain a history of payment transactions involving the sender and/or recipient.

Before, after, or simultaneously with generating the transaction record, the networking system 114 provides 520 transaction instructions to the payment provider 504. In particular, the networking system 114 uses transaction information associated with the payment transaction to determine one or more instructions for processing the payment transaction. To illustrate, the networking system 114 determines instructions to send to the payment provider 504 to cause the payment provider 504 to begin processing the payment transaction for a cash payment from the sender.

Accordingly, the instructions can cause the payment provider 504 to generate 522 a payment code that the sender will use when paying the cash payment. Specifically, the payment code can include a code that the user provides to the cash in location 506 for verifying that the cash payment corresponds to the current payment transaction. To illustrate, the payment code can include an image (e.g., a QR code image), an alphanumerical code, or other unique code corresponding to the payment transaction. Additionally, the payment code can be a temporary code that expires after a specified amount of time.

The instructions can also cause the payment provider 504 to send 524 the payment code to the networking system 114. The networking system 114 then sends 526 the payment code to the sender client device 500a. For example, the networking system 114 can send the payment code in a text message, an instant messaging message, a popup message, an email message, or any other form of electronic or telephonic communication that allows the user to view the payment code and store the payment code for later use with the cash payment.

After receiving the payment code at the sender client device 500a, the sender can view the payment code. In particular, the sender can view the payment code within the client application 502a or within another application associated with the method of delivery of the payment code to the sender client device 500a (e.g., a text messaging application or an email application). The sender can then visit the cash in location 506 (e.g., a physical location) to provide the cash payment for the payment amount to the cash in location 506. While providing the cash payment to the cash in location 506, the sender can also use 528 the payment code with the cash payment at the cash in location 506 to associate the cash payment with the current payment transaction.

Upon receipt of the cash payment, the cash in location 506 can notify 530 the payment provider 504 of the cash payment, and the payment provider 504 can notify 532 the networking system 114 of the cash payment. The networking system 114 can then provide 534 acknowledgement of the cash payment to the sender client device 500a to allow the sender to verify that the cash payment was successful. For example, the networking system 114 can provide an invoice to the sender client device 500a for the sender to store with the sender's records. Additionally, the networking system 114 can maintain an invoice of the payment that the sender can access from any device via the sender's account with the networking system 114.

According to one or more embodiments, the networking system 114 also notifies 536 the recipient of the payment transaction. For instance, the networking system 114 can notify the recipient by sending a notification to the recipient client device 500b. The recipient can view the notification within the client application 502b on the recipient client device 500b. Additionally, the notification to the recipient client device 500b can include a request for the recipient to accept or reject the payment transaction, e.g., by selecting an accept or reject option within the client application 502b.

In the case that the recipient rejects the payment transaction—either explicitly or in response to a threshold amount of time passing without receiving an acceptance of the transaction or without receiving payment account information for the recipient—the networking system 114 can send instructions to the payment provider 504 to provide a refund to the recipient. Specifically, the instructions can cause the payment provider 504 to request the cash in location 506 to transfer the funds from the cash payment to an account for the sender to withdraw or use for future payment transaction. For instance, the payment provider 504 can receive the funds and store the funds in a payment account of the user or in a temporary payment account for the user (e.g., a no-load account).

If the user accepts the payment transaction, the recipient client device 500b sends 538 a payment acceptance message to the networking system 114. The networking system 114 can send 540 the payment acceptance message to the payment provider 504, along with one or more instructions for completing the payment transaction. For instance, the instructions can include one or more commands to cause the payment provider 504 to communicate with the cash in location 506. Based on the instructions, the payment provider 504 can then send a request to the cash in location 506 to transfer 542 the funds to a payment account where the recipient can access the funds. To illustrate, the payment account can be a temporary account (e.g., a no-load account), a digital wallet associated with the recipient, or a cash out payment to the recipient.

After receiving the funds, the payment provider 504 can send 544 a payment completion message to the networking system 114. For example, the payment provider 504 can send the payment completion message in accordance with instructions from the networking system 114. Additionally, the payment completion message can indicate whether the transfer from the cash in location 506 was successful, or whether the payment transaction failed for any reason. The networking system 114 can then notify the sender and/or the recipient of the completion of the payment transaction. As described previously, the networking system can also store 546 the transaction information in the social graph.

Although FIGS. 2-5B illustrate processes for payment transactions involving only one sender and one recipient, the networking system can facilitate payment transactions can include a group payment transaction with a plurality of senders and/or recipients. Specifically, the networking system can treat a payment transaction as a plurality of individual payment transactions involving each separate sender and each separate recipient. For instance, if the networking system determines that the payment transaction involves a plurality of senders and recipients, the networking system can identify each payment provider associated with the payment accounts for the senders.

The networking system can then determine instructions that cause the payment provider(s) to transfer funds from the senders' payment accounts to a no-load account. In particular, the networking system can send instructions to a payment provider (e.g., one of the payment provider(s) of the senders or a payment provider that is specifically associated with the networking system) to create a no-load account for receiving the funds from the plurality of payment accounts of the senders. The networking system can also send instructions to the payment provider(s) associated with the senders to transfer funds to the no-load account previously generated in individual payment transactions.

After the funds are transferred to the no-load account, the networking system can cause the corresponding payment provider to transfer the funds to the recipients' payment accounts. Specifically, the networking system can determine instructions to send to the payment provider associated with the no-load account to distribute the funds from the no-load account to the recipients' payment accounts. For instance, the instructions can cause the payment provider to create individual payment transactions for transferring the funds, according to a distribution established by the group payment transaction, from the no-load account to the individual payment accounts of the recipients.

Alternatively, if the payment transaction involves a many-to-one payment transaction or a one-to-many payment transaction, the networking system can cause payment providers to perform individual transactions directly between payment account(s) of sender(s) and payment account(s) of recipient(s). To illustrate, the networking system can send instructions that cause one or more payment providers to transfer funds without the use of an intermediate no-load account. As such, the networking system can facilitate a wide variety of payment transactions between individuals or groups and involving a variety of different payment methods by providing instructions that leverage integration of payment providers using the API.

As described below, the networking system can include, or be part of, a social networking system that includes a social networking application. In any event, the networking system and/or the social networking system can provide, along and/or in combination with the other components, one or more graphical user interfaces. In particular, the components can allow a user to interact with a collection of display elements for a variety of purposes.

In other words, the client applications 116a, 116b, 202, 302, 402a, 402b, 502a, 502b can comprise client applications of the networking system 114. The client applications can provide graphical user interfaces that allow users to perform payment transactions, such as those described above. Furthermore, the client applications can provide graphical user interfaces that allow the users to access other services/features provided by the networking system 114. For example, FIGS. 6A-6J and the description that follows illustrate various example embodiments of the user interfaces and features of client applications that allow a sender to enter into a payment transaction with a recipient.

Figure 6H:
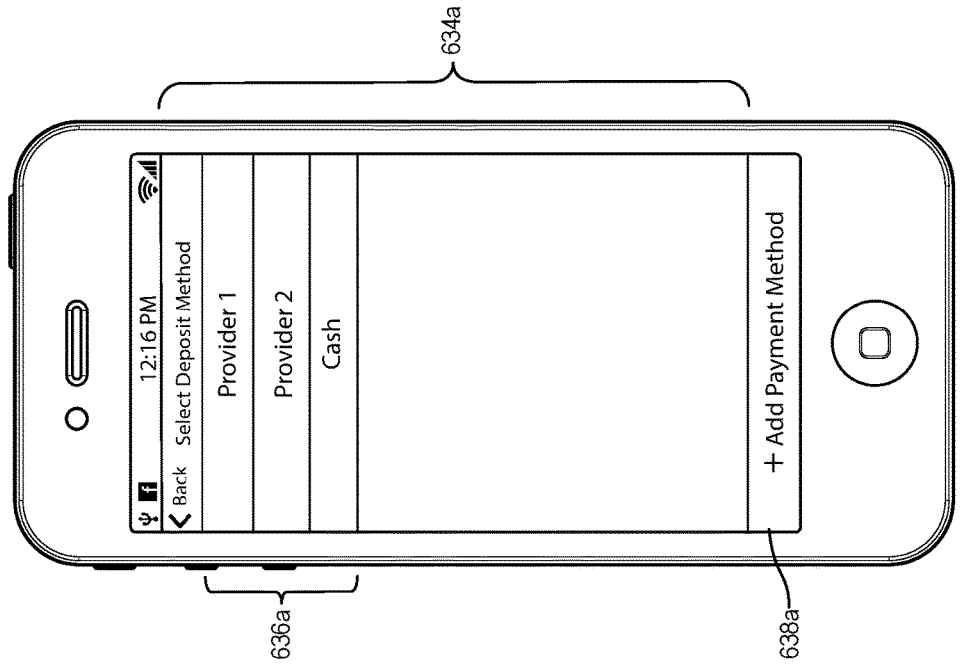
Figure 6G:
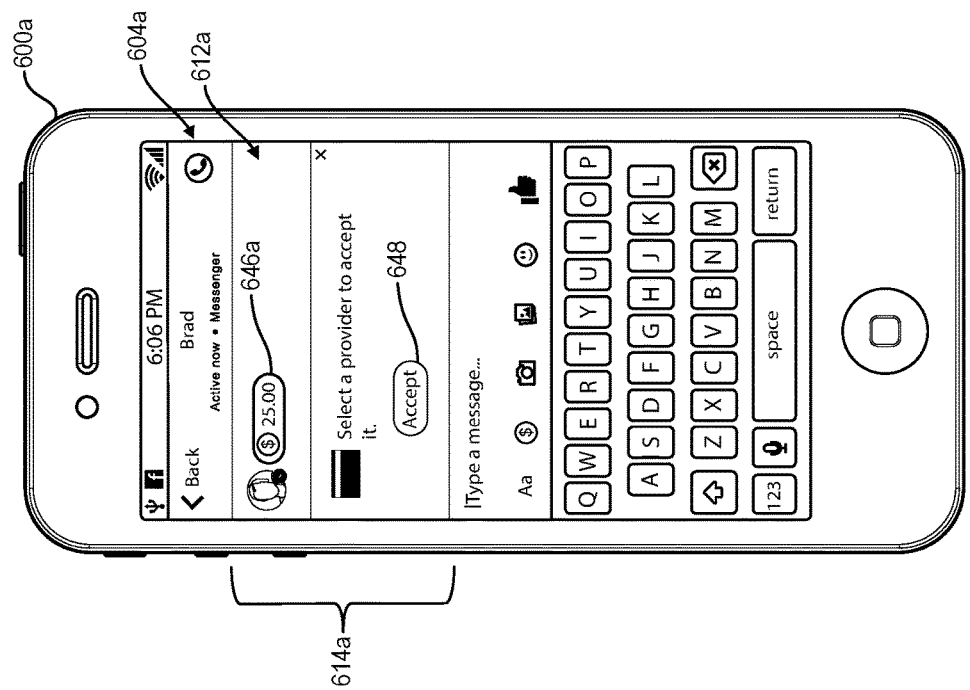

For example, FIGS. 6A-6J illustrate various views of GUIs provided by client applications of user devices to facilitate electronic messaging and sending and receiving payments. In some examples, a client device (e.g., any of the client devices illustrated in FIGS. 2-5B) implements at least some of the operations described in relation to processing payment transactions by way of the networking system 114 of FIG. 1. For example, FIG. 6A illustrates a client device 600 that is a handheld device such as a mobile phone device (e.g., a smartphone). As used herein, the term "handheld device" refers to a device sized and configured to be held/operated in a single hand of a user. In additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

The client device 600 can include any of the features and components described below in reference to a computing device 1000 of FIG. 10. As illustrated in FIG. 6A, the client device 600 includes a touchscreen 602 that can display or provide user interfaces and by way of which user input may be received and/or detected. As used herein, a "touchscreen display" refers to the display of a touchscreen device. In one or more embodiments, a touchscreen device may be a client device with at least one surface upon which a user may perform touch gestures.

As noted previously, the networking system can include, or be associated with, an electronic messaging system (e.g., a messaging application such as FACEBOOK MESSENGER) and an electronic payment system. FIG. 6A illustrates a client application 604 that includes a people or contacts user interface 606 on the touchscreen 602. The contacts user interface 606 can provide a list of contacts of a user (also referred to as "sender") of the client device 600. In particular, the contacts user interface 606 can list "friends" or contacts with which the user is connected or associated within the networking system.

The contacts user interface 606 can further provide one or more statuses of each of the contacts. For example, the contacts user interface 606 can indicate whether a given contact or co-user is active (e.g., logged into the client application 604, connected to the Internet, recently performed an action using the client application 604) via a first status indicator 608. The first status indicator 608 can include a graphical user interface object such as an icon. In one embodiment, the first status indicator 608 includes a dot of a first color (e.g., green) next to a name of each co-user who is active. Along related lines, the first status indicator 608 can also include a dot of a second color (e.g., grey) next to users who are inactive.

The contacts user interface 606 can indicate whether a given the type of device a contact or co-user is currently using via a device indicator 610. The device indicator 610 can include a graphical user interface object such as an icon. For example, as shown the device indicator 610 can include the words "Web" indicating that a co-user is active or logged into the client application 604 using a personal computer. Along similar lines, the device indicator 610 can include the word "Mobile" to indicate that a given contact is active or logged into the client application 604 using a mobile device, such as a mobile phone. Additionally, or alternatively, the device indicator 610 can indicate a brand or model of the client device of a given co-user.

The client application 604 can receive notifications or indications of the statuses of the contacts associated with the user of the client device 600 from the networking system (e.g., from a network application of the networking system). For example, the client application 604 can send notifications or status updates to the networking system to indicate when the client application is 604 active or online. The client application 604 can then send the statuses of contacts associated with a given user to the client device 600 associated with the given user. Along related lines, the client application 604 can determine if a given user is associated with a specific payment provider or payment method and provide an indication that the given user is able to send and receive payments via the specific payment provider or payment method.

In one or more embodiments, the networking system 114 has hundreds of thousands, millions, or even billions of users. By integrating with the networking system 114, payment providers enable their users to send or receive payment transactions with any of the users of the networking system 114 (whether individuals or businesses).

As described above, the networking system can facilitate receiving and sending data. In one or more embodiments, the networking system facilitates receiving and sending electronic communications between the client device 600 and one or more other client devices (e.g., a client device of a co-user). Also, the client application 604 can display electronic communications sent and received in a messaging thread within a messaging interface 612, as illustrated in FIG. 6B. For example, a user can interact with a contact list in the list of contacts of the contacts user interface 606 in order to open the messaging interface 612 that facilitates exchanging messages with the contact.

As shown, the messaging interface 612 can include a messaging thread 614 that includes electronic messages 616a sent from an account of a user of the client device 600. Similarly, the messaging thread 614 can include electronic messages 616b received by the account of a co-user (i.e., "Joe"). In one or more embodiments, the client application 604 organizes the messaging thread 614 such that new messages are added to the bottom of the messaging thread 614 so that older messages are displayed at the top of the messaging thread 614. In alternative embodiments, the client application 604 may organize the messages 616a, 616b in any manner that may indicate to a user the chronological or other relationship between the messages 616a, 616b.

The client application 604 provides a variety of electronic communication characteristics to help a user distinguish between electronic communications in the messaging thread 614. For example, as illustrated in FIG. 6B, the client application 604 displays the electronic messages 616a sent from an account of the user of the client device 600 with different visual characteristics than the electronic messages 616 received from the co-user. To illustrate, the client application 604 can vary the position, orientation, font, text color, background color, or other visual characteristics to allow the user to easily determine a source of each electronic message.

As mentioned above, the client application 604 may also provide a message input control palette or toolbar 622. As illustrated in FIG. 6B, the client application 604 displays the message input control palette or toolbar 622 as part of the messaging interface 612. In one or more embodiments, the message input control palette or toolbar 622 includes a variety of selectable message input controls that provide a user with various message input options or other options. For example, in FIG. 6B, the message input control palette or toolbar 622 includes a text input control 624a, a payment control 624b, a camera viewfinder input control 624c, a multimedia input control 624d, a symbol input control 624e, and a like indicator control 624f. In one or more alternative embodiments, the message input control palette or toolbar 622 may provide the input controls 624a-624e in a different order, may provide other input controls not displayed in FIG. 6B, or may omit one or more of the input controls 624a-624e shown.

As will be described below in greater detail, a user may interact with any of the input controls 624a-624e in order to compose and send different types of electronic communications. For example, if a user interacts with the text input control 624a, the client application 604 may provide a touchscreen display keyboard 618 in a portion of the messaging interface 612 that the user may utilize to compose a textual message 620. Similarly, if a user interacts with the multimedia input control 624d, the client application 604 may provide a multimedia content item display area (e.g., for displaying digital photographs, digital videos, etc.) within a portion of the messaging interface 612. Likewise, if a user interacts with the camera viewfinder input control 624c, the client application 604 may provide a digital camera interface within a portion of the messaging interface 612 that the user may utilize to capture, send, and add a digital photograph or digital video to the messaging thread 614.

A user may interact with any of the message input controls 624a-e n order to compose and send a message or a payment to one or more co-users via the networking system. For example, in FIG. 6B, a user's finger is shown interacting with the payment control 624b. In one or more embodiments, the client application 604 can detect interactions (e.g., a tap touch gesture) of the user's finger or other input device with the payment control 624b. Upon detecting a tap touch gesture on the payment control 624b, the client application 604 may display a payment interface 626 within the client application 604, as shown by FIG. 6C.

As will be apparent from the description herein, the payment interface 626 can allow a user to initiate a payment transaction (begin a process to send a payment, request a payment, etc.) with a co-user involved in the messaging thread. For example, FIG. 6C illustrates that the payment interface 626 can include a numerical keypad that can allow a user to select a payment amount 628 by entering the desired digits in sequence (i.e., by tapping "2" then "5" within the numerical keypad 630 to arrive at $25). The payment interface can display the selected digits to allow the user to verify that the selected digits correspond to the desired payment amount and to modify the selected digits accordingly. One will appreciate in light of the disclosure herein that the payment interface 626 of FIG. 6C is one implementation of a payment interface. In one or more embodiments, a user can select the payment interface 626 from a plurality of available payment interfaces. For instance, the payment interface 626 can instead be displayed in a portion of the messaging interface 612 to allow the user to view messages in the messaging thread 614 while initiating a payment transaction with the co-user.

In one or more embodiments, in response to the sender selecting a pay element 632 or otherwise causing the payment request to send, the client application 604 displays a payment method selection interface 634, as illustrated in FIG. 6D. The payment method selection interface 634 allows the user to select a payment method for funding the payment transaction. For example, the user can select from a plurality of previously entered payment methods 636 corresponding to one or more payment providers. To illustrate, within the payment method selection interface 634, the user can select a payment method for a credit/debit card account, an electronic wallet, a stored value account (e.g., prepaid account or gift card), a cash payment, or other payment method.

Alternatively, the user can select an option 638 to add a payment method corresponding to a payment provider. In particular, selecting the option 638 to add a payment method can cause the client application 604 to display a payment method interface that allows the user to enter information for a new payment method. The user can enter a payment account identifier, authorization information, and/or personal information that allows the networking system to verify the payment method. Additionally, the networking system can verify the payment method with a corresponding payment provider.

In one or more instances, the networking system also verifies that the payment provider has integrated with the networking system using the API, as described previously. If the payment provider has integrated with the networking system using the API, the networking system can provide instructions to the payment provider when facilitating the payment transaction. If the payment provider has not integrated with the networking system, the networking system can notify the user that the payment provider is unavailable for payments via the networking system, and request that the user select a new payment method. Additionally, the payment provider can suggest a payment method, such as another method that the user has stored or a cash payment, for processing the payment transaction.

In one or more embodiments, the client application 604 allows a user to select a default payment method for use in future payment transactions. Specifically, if the user selects a default payment method, the client application 604 may automatically identify the default payment method when the user selects the pay element 632. Thus, the client application 604 may not display the payment method selection interface 634, and may instead proceed with the payment transaction using the default payment method. The user may change the default payment method at any time.

After the user selects a payment method, the client device 600 can generate a payment request and send a payment initiation request to the networking system, as described previously. The payment message can include payment information (e.g., payment amount, payment method, recipient) that the networking system uses to generate instructions for facilitating the payment transaction. If any of the required payment information is not sent in the payment message, the networking system can request that the user enter the appropriate information. For instance, if the networking system cannot identify the user's payment account, the networking system can request that the sender enter his or her payment account. In at least some implementations, the networking system can send instructions to the payment provider to process the payment transaction before receiving the co-user's payment account information, as described in more detail below.

After identifying the payment information and generating instructions corresponding to the payment transaction, the networking system can facilitate the payment transaction by sending the payment information and the instructions to a payment provider. Specifically, the networking system can send the payment information and instructions to the payment provider associated with the selected payment method. The instructions can include one or more commands for the payment provider to cause the payment provider to perform one or more operations associated with the payment transaction. Additionally, because the instructions are tailored to the specific payment transaction, the networking system can facilitate payment transactions with a variety of different payment methods.

In one or more embodiments, the networking system determines that the payment transaction involves password authorization. For example, as described previously, some payment transactions may utilize a one-time password that corresponds only to the current payment transaction. As shown in FIG. 6E, the client application 604 can display a password entry interface 640 that requests the user to input a one-time password. The password entry interface 640 can include a popup dialog 642 or overlay that includes a text entry field for entering the one-time password.

Additionally, FIG. 6F illustrates that the client device 600 receives a message 644 (e.g., a text message or instant message) indicating the one-time password from the payment provider. When the user enters the password (e.g., into the popup dialog 642), the client device 600 sends the entered password to the networking system, which then sends the password to the payment provider. Accordingly, the payment provider can verify the identity or authorized use of the user of the client device 600, and can initiate the payment transaction according to the instructions provided by the networking system.

After initiating the payment transaction (e.g., funding the payment transaction using the payment method that the user selected), the networking system can send a notification to the client device 600 indicating that the payment transaction was initiated successfully. In one or more embodiments, the client application 604 displays the notification within the messaging interface 612. For example, the client application 604 can display the notification as a message indicating the payment for display within the messaging thread 614 according to the chronological order of messages in the conversation. FIG. 6F illustrates a message 646, within the messaging thread 614, indicating that the payment transaction between the user and the co-user was initiated successfully, pending acceptance by the co-user. Specifically, the message 646 can include a payment amount for the payment transaction and an icon 647 that indicates the pending status of the payment transaction (e.g., a dollar sign within an unfilled or unshaded circle outline).

As described above, FIGS. 6A-6F illustrate various views of GUIs in a client application on a client device of a sender of a payment transaction. FIGS. 6G-6J illustrate various views of GUIs in a client application 604a on a client device 600a of a co-user (also referred to as "recipient"). As illustrated, the position, color, and/or other visual characteristics of messages within a messaging thread 614a between the sender and the recipient are displayed in a layout that is reversed from FIGS. 6A-6F, according to the respective users of the client devices 600, 600a. Additionally, as shown, after the user initiates the payment transaction with the recipient, the networking system can also update messages within the messaging thread 614a at the client device 600a to notify the recipient of the payment transaction.

In one or more embodiments, the networking system pushes the message 646a to the recipient client device 600a. For example, as previously described, the client application 604 can show the payment amount in the messaging thread 614a of the messaging interface 612a associated with the sender's identity, and text content (e.g., "Sent from Messenger") in a message 646a with the payment amount. To illustrate, the client application 604a can insert the message 646a into the messaging thread 614a with other messages exchanged between the sender and the recipient. Additionally, the client application 604a can present the message 646a in another manner (e.g., by providing a notification in a notification area of the client device 600a or in an overlay of the messaging interface 612a).

In one or more embodiments, the client application 604a provides a confirmation request to the recipient to allow the recipient to accept the payment transaction (i.e., by selecting an element in the messaging interface such as an accept element 648). After the recipient accepts the payment transaction, the networking system can facilitate completion of the payment transaction and begin the process of transferring funds from the sender to the recipient. In an alternative example, the payment request can merely bring attention of the payment transaction to the recipient while the networking system automatically processes and completes the payment transaction.

In one or more embodiments, when the recipient selects to accept the payment or after the recipient receives the payment request, the client application 604a can display an interface for selecting a deposit method. FIG. 6H illustrates a deposit method selection interface 634a including a plurality of available deposit methods associated with the recipient. For example, the deposit method selection interface 634a can display a plurality of deposit methods 636a for payment accounts of the recipient (e.g., a debit/credit card account, a stored value account, or a cash withdrawal). The deposit methods can be listed according to the different payment providers and/or according to names of the corresponding payment accounts. As described previously with respect to the sender, the recipient can add one or more additional deposit methods by selecting an option 638a to add a deposit method. The deposit method(s) can also be the same as payment methods for the recipient.

According to at least some embodiments, the recipient may set a default deposit method for receiving payments from other users. For instance, the recipient can select a deposit method and set the deposit method as a default deposit method such that the networking system facilitates payment transactions with the recipient using the default deposit method. To illustrate, the networking system can receive the acceptance of the payment transaction from the recipient and, automatically and without additional user input, provide instructions for transferring the funds to the payment account associated with the default deposit method of the recipient.

In one or more alternative embodiments, if the recipient is not registered with a payment provider that is integrated with the networking system, or with any payment provider, the networking system can facilitate the processing of the payment transaction using a temporary account. For instance, as described previously, the networking system can cause a payment provider that is integrated with the networking system to create a no-load account (i.e., a holding account) to temporarily hold the funds. If the recipient accepts the payment, the recipient can then choose to transfer the funds from the no-load account to another account by entering the payment account information and/or by registering with a payment provider.

Figure 6J:
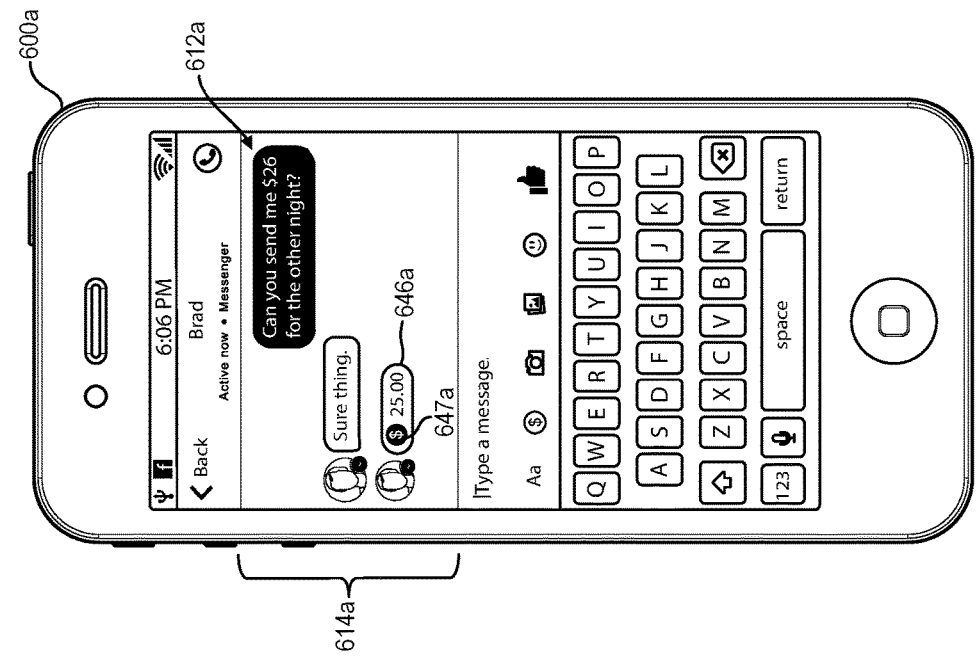
Figure 6I:
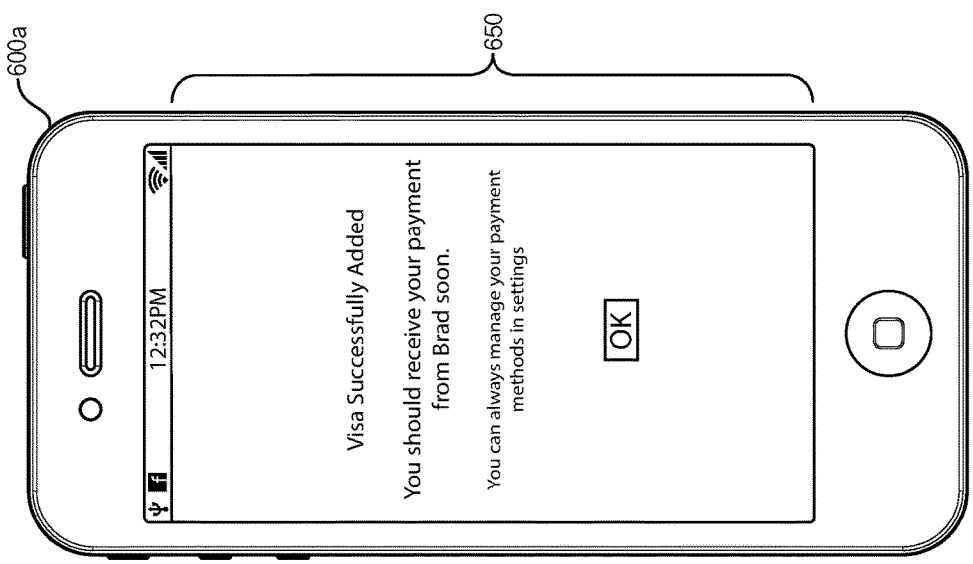

As shown in FIG. 6I, after the payment transaction is complete (or after the recipient accepts the payment transaction and provides a deposit method), the client application 604a can send a payment completion message 650 notifying the recipient that the payment transaction is complete, and that the recipient should receive the payment within a certain timeframe. For example, the payment completion message 650 can notify the recipient that the recipient should receive the payment within a certain time period. In one or more embodiments, the recipient client device 600a displays the payment completion message 650 after receiving a payment status update indicating that the payment transaction is complete from the networking system.

In one or more embodiments, after closing the payment completion message 650 or otherwise completing the payment transaction, the networking system provides status updates to the message 646a indicating the payment in the messaging thread 614 on the sender client device 600 and/or the messaging thread 614a of the recipient client device 600a to reflect that the payment transaction has completed. For example, the client application 604a can change certain characteristics of the message (e.g., a color, icon, or text) in the messaging thread 614a. To illustrate, in FIG. 6J, the client application 604a changes the color or shading of the icon 647a with the message 646a indicating the payment transaction from light as shown in FIG. 6F to dark, as shown in FIG. 6J. Additionally, or alternatively, the client application 604a can change the position of the message within the messaging thread 614a, the border width of the message 646a, the background color of the message 646a, the size and font of the message 646a, or any other characteristic of the message 646a suitable for this purpose. Additionally, or alternatively, the client application 604a can apply modifications to the appearance of the payment amount based on other criteria, such as when the payment transaction is complete, when the funds are available to the sender, or if the payment transaction fails.

FIGS. 1-6J, the corresponding text, and the examples, provide a number of different systems and devices for processing electronic payment transactions using a networking system. In addition to the foregoing, embodiments can be described in terms of flowcharts comprising acts and steps in a method for accomplishing a particular result. For example, FIG. 7 illustrates a flowchart of an exemplary method in accordance with one or more embodiments.

Figure 7:
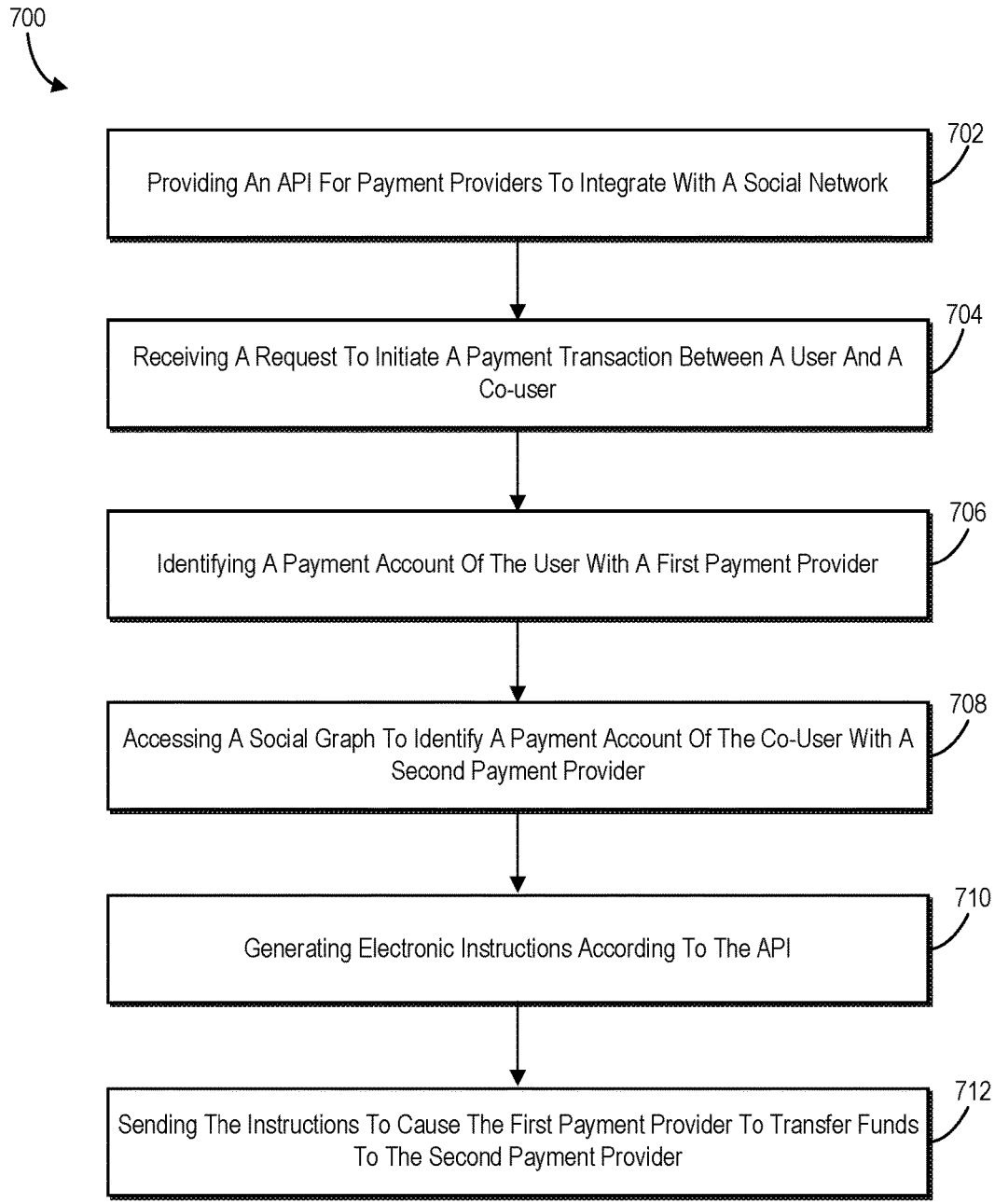
FIG. 7 illustrates a flow chart of a series of acts in a method of facilitating payment transactions using an application program interface in accordance with one or more embodiments.

FIG. 7 illustrates a flowchart of a method 700 of facilitating payment transactions using an application program interface. The method 700 includes an act 702 of providing an application program interface ("API") for payment providers to integrate with a social network. For example, act 702 involves providing, by one or more servers associated with a social network, an application program interface that allows payment providers to integrate with the social network in a manner that allows users of the payment providers to transfer funds to other users in the social network.

Act 702 can involve creating the application program interface to include a plurality of commands that cause the payment providers to perform a plurality of actions associated with processing payment transactions. Additionally, act 702 can involve configuring the application program interface such that payment providers that integrate with the social network can send and receive payments from any other payment provider integrated with the social network.

The method 700 further includes an act 704 of receiving a request to initiate a payment transaction between a user and a co-user. For example, act 704 involves receiving, from a client device 104a associated with a user, a request to initiate a payment transaction between the user and a co-user of the social network. Act 704 can involve receiving a request to initiate the payment transaction in connection with a third-party service that facilitates payment transactions between users of the third-party service and is integrated with the social network.

The method 700 also includes an act 706 of identifying a payment account of the user with a first payment provider. For example, act 706 involves identifying a first payment account of the user with a first payment provider 108a. Act 706 can involve determining that the user has registered with the first payment provider 108a and has a payment account with the first payment provider 108a. The first payment account can be a credit card account, debit card account, or stored value account. Act 706 can also involve identifying the first payment account associated with a cash in location 506 that receives a cash payment from the user 102a to fund the payment transaction.

As part of act 706, or as an additional act, the method 700 can include determining that the request to initiate the payment transaction comprises a request to initiate the payment transaction between the user and a plurality of recipients, the plurality of recipients comprising the co-user, and identifying a plurality of payment accounts associated with the plurality of recipients. The method 700 can also include receiving a request to initiate a payment transaction to transfer funds from a plurality of users of the social network to a plurality of co-users.

Additionally, the method 700 includes an act 708 of accessing a social graph to identify a payment account of the co-user with a second payment provider 108b. For example, act 708 involves accessing a social graph of the social network to identify a second payment account associated with the co-user from a node of the social graph comprising information about the co-user, the second payment account being with a second payment provider 108b. Act 708 can involve identifying the second payment account in response to requesting payment account information from the co-user.

The method 700 further includes an act 710 of generating electronic instructions according to the API. For example, act 710 involves generating, according to the application program interface, one or more electronic instructions comprising one or more commands that enable the first payment provider 108a to complete the payment transaction directly with the second payment provider 108b. Act 710 can involve generating one or more electronic instructions comprising one or more commands that enable a plurality of payment providers to complete a payment transaction involving a plurality of senders. For example, act 710 can involve generating one or more electronic instructions comprising one or more commands that enable a plurality of payment providers associated with the plurality of users to complete the payment transaction by causing the plurality of payment providers to communicate directly with at least one payment provider.

For example, act 710 can involve generating, according to the API, a plurality of electronic transaction records comprising transaction information for transferring the funds from the first payment account of the user to the second payment account associated with the co-user. Additionally, act 710 can involve storing, by the one or more servers associated with the social network and within the social graph of the social network, a first transaction record from the plurality of electronic transaction records in the first node of the social graph and a second transaction from the plurality of electronic transaction records in the second node of the social graph. Act 710 can involve generating the one or more electronic instructions based on transaction information in the first transaction record.

The method 700 also includes an act 712 of sending instructions that cause the payment provider to transfer funds. For example, act 712 involves the one or more electronic instructions to the first payment provider to cause the first payment provider to perform the one or more commands to transfer funds from the first payment account of the user to the second payment account associated with the co-user. To illustrate, act 712 can involve sending an instruction that causes the first payment provider 108a to communicate with another payment provider while processing the payment transaction. Specifically, act 712 can involve sending an instruction that causes the first payment provider 108a to communicate with the second payment provider 108b to transfer the funds from the first payment account to the second payment account. Alternatively, act 710 can involve sending one or more instructions that cause the first payment provider 108a to communicate with a payment network 110 to transfer funds from the first payment account to the second payment account.

Additionally, act 712 can involve sending an instruction that causes the first payment provider 108a to generate a temporary account for the co-user, and sending an instruction that causes the first payment provider 108a to first transfer the funds from the first payment account of the user to the temporary account. For example, the temporary account can be a no-load account. The method 700 can also include receiving a response indicating that the co-user accepted the payment transaction from the user, and transferring the funds from the temporary account to the second payment account associated with the co-user.

Act 712 can also involve determining that the user selected a cash payment for funding the payment transaction, and sending an instruction that causes the first payment provider 108a to send a payment code to the client device 104a associated with the user, the payment code corresponding to the payment transaction. The method 700 can also include sending one or more instructions that cause the first payment provider 108a to transfer the funds from the first payment account associated with the cash in location 506 to the second payment account.

As part of act 712, or as an additional act, the method 700 can include sending, to the first payment provider 108a, an instruction to initiate the payment transaction, receiving, from the first payment provider 108a in response to the instruction to initiate the payment transaction, receiving a response indicating that the first payment provider 108a requires authorization to process the payment transaction, receiving, from the client device, an authorization credential associated with the first payment account, and validating the authorization credential with the first payment provider 108a. For instance, the instruction to initiate the payment transaction can include an initiation instruction based on the application program interface.

As part of act 712, or as an additional act, the method 700 can include sending, to the first payment provider 108a, account information for the first payment account of the user, receiving, from the first payment provider 108a, a response comprising a redirect message associated with authorizing the payment transaction, and sending, to the client device 104a, the redirect message to redirect the client device 104a to the first payment provider 108a.

As part of act 712, or as an additional act, the method 700 can include sending, to the first payment provider 108a, an instruction that causes the first payment provider 108a to initiate a payment transaction to transfer the funds from the first payment account to the second payment account in a cash-out payment transaction, wherein the second payment account associated with the co-user comprises a payment account of a third-party entity for providing a cash payment to the co-user.

The method 700 can also include processing a group payment transaction involving more than one sender or more than one recipient as a plurality of individual payment transactions. For example, the method 700 can include determining that the request to initiate the payment transaction comprises a request to initiate the payment transaction between the user and a plurality of recipients, the plurality of recipients comprising the co-user, identifying a plurality of payment accounts associated with the plurality of recipients, and sending one or more instructions that cause the first payment provider 108a to transfer funds from the first payment account to the plurality of payment accounts associated with the plurality of recipients in separate transactions.

In one example, the method 700 can include sending one or more instructions that cause the first payment provider 108a to transfer, in a plurality of separate transactions, funds from a plurality of payment accounts of a plurality of senders to a temporary account associated with the first payment provider 108a. The method 700 can then include sending one or more instructions that cause the first payment provider 108a to transfer, in a plurality of separate transactions, funds from the temporary account to a plurality of accounts associated with a plurality of recipients. Alternatively, the method 700 can include sending one or more instructions that cause the first payment provider 108a to transfer, in a plurality of separate transactions, funds from the first payment account to a plurality of payment accounts associated with a plurality of recipients without storing the funds in a temporary account.

The method 700 can include sending one or more instructions to the plurality of payment providers to cause the plurality of payment providers to perform one or more commands to transfer funds from corresponding payment accounts to a temporary account associated with a payment provider. The method can also include sending one or more instructions to the payment provider associated with the temporary account to cause the payment provider associated with the temporary account to perform one or more commands to transfer funds from the temporary account to a plurality of payment accounts of the plurality of co-users according to a distribution of the payment transaction.

The method 700 can also include receiving, from the first payment provider 108a, an indication whether the payment transaction was successful, and storing information indicating whether the payment transaction was successful in a database in a social graph of the social network. For example, storing the information in the social graph of the social network comprises storing a transaction record comprising information about the payment transaction with a user account of the user and with a user account of the co-user. The transaction record can comprise a payment amount, payment provider identifier(s), payment account identifier(s), an encrypted payment credential, user identifier(s), or a transaction type. The transaction type can include a debit or credit payment transaction, a stored value account transaction, or a cash payment transaction.

Figure 8:
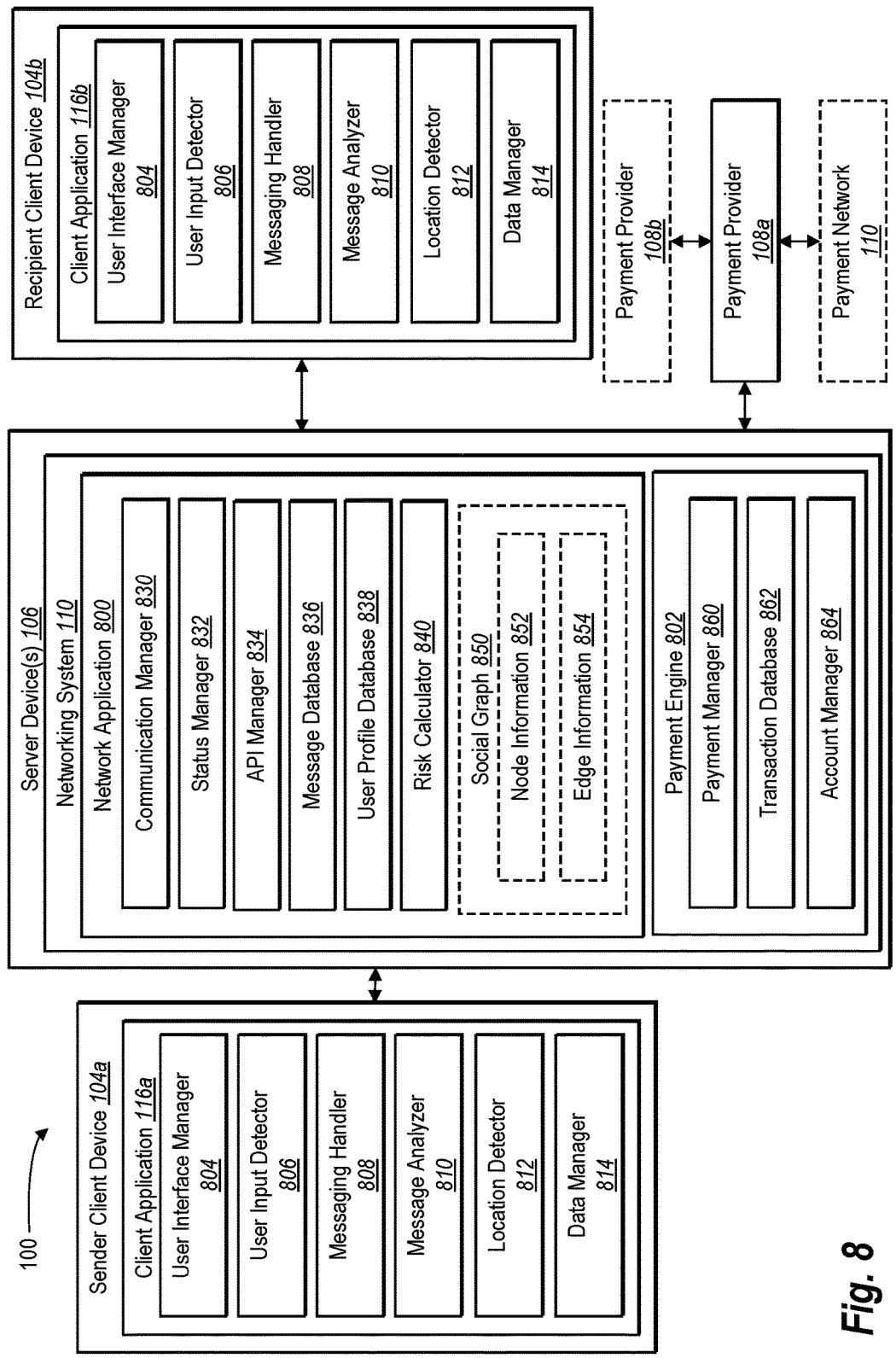
FIG. 8 illustrates a detailed schematic diagram of the environment of FIG. 1 in accordance with one or more embodiments.

FIG. 8 illustrates a schematic diagram illustrating additional details of the environment of FIG. 1 including the networking system 114. Specifically, FIG. 8 includes a sender client device 104a, a recipient client device 104b (together "client devices 104a, 104b"), server device(s) 106, payment providers 108a, 108b, and a payment network 110. Additionally, the server device(s) 106 include the networking system 114, and the client devices 104a, 104b include client applications 116a, 116b. In general, the networking system 114 allows a user associated with the sender client device 104a to send a payment to a co-user associated with the recipient client device 104b. Additionally, the networking system 114 can allow the user to exchange messages with the co-user.

FIG. 8 illustrates that the sender client device 104a and the recipient client device 104b include client applications 116a, 116b (e.g., a messaging application, a social networking application, or an e-commerce application) with various components, and the server device(s) 106 include a network application 800 and the networking system 114 with various components. The components of the client applications 116a, 116b and the networking system 114 can work together to allow a user to send payments to and/or exchange messages with a co-user, as described in greater detail below.

As illustrated, the client application 116a of FIG. 8 includes a user interface manager 804, a user input detector 806, a message handler 808, a message analyzer 810, a location detector 812, and a data manager 814. FIG. 8 also illustrates that the network application 800 of the networking system 114 includes a communication manager 830, a status manager 832, an API manager 834, a message database 836, a user profile database 838, and a risk calculator 840. As described below, the network application 800 can also optionally include a social graph 850, which includes node information 852 and edge information 854. FIG. 8 further illustrates that the payment engine 802 of the networking system 114 includes a payment manager 860, a transaction database 862, and an account manager 864.

Each of the components of the client devices 104a, 104b and the server device(s) 106 can communicate with each other or with components using any suitable communication technologies. It will be recognized that although the components of the client devices 104a, 104b and the networking system 114 are shown to be separate in FIG. 8, any of the components may be combined into fewer components, such as into a single facility or module, or divided into more components as may serve a particular embodiment. While FIG. 8 describes certain components as part of the client applications 116a, 116b and other components as part of the networking system 114 (including the components in the network application 800 or payment engine 802), the present disclosure is not so limited. In alternative embodiments, one or more of the components shown as part of the client applications 116a, 116b can be part of the network application 800 or networking system 114, or vice versa. Similarly, one or more components shown as part of the network application 800 can be part of the networking system 114 or vice versa.

The components can include software, hardware, or both. For example, the components can include computer instructions stored on a non-transitory computer readable storage medium and executable by at least one processor of the client devices or the server device(s). When executed by the at least one processor, the computer-executable instructions can cause the client device(s) or the server device(s) to perform the methods and processes described herein. Alternatively, the components can include hardware, such as a special purpose processing device to perform a certain function or group of functions. Additionally, the components can include a combination of computer-executable instructions and hardware.

As described below, the client application 116a of the sender client device 104a and the client application 116b of the recipient client device 104b include the similar components. Accordingly, the discussion of the components of client application 116a below applies to the components of client application 116b. In one or more embodiments, the client application 116a is a native application installed on the client device. For example, the client application 116a may be a mobile application that installs and runs on a mobile device, such as a smart phone or a tablet. Alternatively, the client application 116a can be a desktop application, widget, or other form of a native computer program. Alternatively, the client application 116a may be a remote application that the client device accesses. For example, the client application 116a may be a web application that is executed within a web browser of the client device.

As mentioned above, and as shown in FIG. 8, the client application 116a can include a user interface manager 804. The user interface manager 804 provides, manages, and/or controls a graphical user interface (or simply "user interface") that allows a user to compose, view, send, and receive messages, as well as send and receive payments. For example, the user interface manager 804 can provide a user interface that facilitates the composition of a message, such as an instant message. The user interface manager 804 can also provide user interfaces for engaging in exchanging messages and/or entering into payment transactions with other users of the networking system 114.

More specifically, the user interface manager 804 may facilitate the display of a user interface (e.g., by way of a display device associated with the corresponding client device). For example, the user interface may be composed of a plurality of graphical components, objects, and/or elements that allow a user to compose, send and receive messages or payments. More particularly, the user interface manager 804 may direct the client device to display a group of graphical components, objects and/or elements that enable a user to view a messaging thread. For instance, the user interface manager 804 can provide one or more user interfaces that allow a user to input one or more types of content into a message. To illustrate, content can include text, images, digital media, files, location information, payment information and any other data that can be included as part of a message.

As further illustrated in FIG. 8, the client application 116a can include a user input detector 806. In one or more embodiments, the user input detector 806 can detect, receive, and/or facilitate user input in any suitable manner. In some examples, the user input detector 806 can detect one or more user interactions with respect to the user interface. As referred to herein, a "user interaction" means a single interaction, or combination of interactions, received from a user by way of one or more input devices.

For example, user input detector 806 can detect a user interaction from a keyboard, mouse, touch pad, touchscreen, and/or any other input device. In the event the client device includes a touchscreen, the user input detector 806 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 806 may additionally, or alternatively, receive data representative of a user interaction. For example, user input detector 806 may receive one or more user configurable parameters from a user, one or more user commands from the user, and/or any other suitable user input. The user input detector 806 may receive input data from one or more components of the client application 116a, from the storage on the sender client device 104a, or from one or more remote locations (e.g., the network application 800).

As further illustrated in FIG. 8, the client application 116a includes a message handler 808 that manages messages provided to or sent from the client application 116a. For example, the message handler 808 can interact with the user interface manager 804 and the user input detector 806 to coordinate the sending and receiving of messages using the client application 116a. The message handler 808 may direct the sending and receiving of messages to and from the network application over the course of an electronic messaging session among a plurality of participants. The message handler 808 may organize incoming and outgoing messages and direct the user interface manager 804 to display messages.

In one or more embodiments, the message handler 808 can facilitate receiving and sending data via the client application 116a. In particular, message handler 808 can facilitate sending and receiving messages. For example, the message handler 808 can package content to be included in a message and format the message in any necessary form that is able to be sent through one or more communication channels and using an appropriate communication protocol, as described herein. To illustrate, the message handler 808 can send payment transaction information to the server device(s) at various stages of a payment transaction process. Likewise, the message handler 808 can process messages the client device receives from other users.

In addition to providing communication functions for the client application 116a, the message handler 808 can provide access to message data. For example, the message handler 808 can access data that represents a list of contacts, or one or more groups of contacts, to include and recipients to a message. To illustrate, the message handler 808 can obtain and provide data representing a contact list to the user interface manager 804 to allow the user to search and browse a contact list, and ultimately select an individual contact or group of contacts to include as recipients of a message. In one or more embodiments, a social networking system can maintain remote contact list data (e.g., a "friends list"), and the message handler 808 can access the contact list data on the social networking system for use within the client application 116a.

The message handler 808 can also provide access to other local or remote data that the client application 116a can use to compose, send and receive messages. For instance, the message handler 808 can obtain access to files, images, audio, video and other content that a user can include in a message. Moreover, the message handler 808 can provide access to one or more functions of the client device to provide the user the ability to capture or create content to include within a message. For example, the message handler 808 can activate a camera, a microphone, or other function that allows the user to capture content to include in a message. The message handler 808 can also facilitate the sending of payment messages and payment information (including secure payment information) in connection with payment transactions.

As mentioned above, the client application 116a can further include a message analyzer 810. The message analyzer 810 can analyze messages sent from and received by the client application 116a for events or attachments. In one or more embodiments, the message analyzer 810 can identify events from contextual content in the exchanged messages. For example, the message analyzer 810 can identify payment requests based on contextual information in a text message or instant message sent from a user to a co-user.

The client application 116a can further include a location detector 812. The location detector 812 can access or identify a location of the client device based on GPS information from the client device, cell tower triangulation, WIFI received signal strength indication, WIFI wireless fingerprinting, radio-frequency identification, near-field communication, by analyzing messages, or based on data from other sources. The location detector 812 can then provide the location of the client device to the message analyzer 810 and/or the network application 800. Additionally, the location detector 812 can receive indications of the location of other client devices and/or locations for making cash payments (e.g., the cash in location 506 of FIGS. 5A-5B) from the network application and provide them to the message analyzer 810.

As discussed above, the client device can include a data manager 814, as illustrated in FIG. 8. The data manager 814 can maintain message data representative of data used in connection with composing, sending, and receiving messages between a user and one or more other users. For example, message data can include message logs, contact lists, content, past communications, past payment transactions, and other similar types of data that the client application 116a can use in connection with providing the ability for users to communicate using the client application 116a.

The data manager 814 may also maintain payment data representative of information used to generate payment requests. For example, payment data may include payment method data (i.e., a credential) and/or account data (e.g., bank or credit card account data, stored value account data). Furthermore, payment data can include payment preferences (e.g., a default payment method). In general, payment data can include any data that the networking system 114 can use in connection with facilitating a payment.

As briefly mentioned above, in addition to the client devices, the networking system 114 can further include a network application 800 that is implemented in whole or in part on the server device(s) 106. In one or more embodiments of the present disclosure, the network application 800 comprises a social networking system (such as but not limited to FACEBOOK™, but in other embodiments the network application 800 may comprise another type of application, including but not limited to an e-mail application, search engine application, banking application, or any number of other application types that utilizes user accounts.

In one or more embodiments where the network application 800 comprises a social networking system, the network application 800 includes a social graph 850 for representing and analyzing a plurality of users and concepts. Node storage of the social graph can store node information 852 comprising nodes for users, nodes for concepts, nodes for transactions, and nodes for items. Edge storage of the social graph can store edge information 854 comprising relationships between nodes and/or actions occurring within the social networking system. Further detail regarding social networking systems, social graphs, edges, and nodes is presented below with respect to FIG. 12.

The communication manager 830 can process messages received from client applications 116a, 116b. For example, the communication manager 830 can interact with a message handler 808 of a client application 116a. The communication manager 830 can act as a director for messages sent back and forth among users in an electronic messaging thread. The communication manager 830 may receive a message from client application 116a, detect the intended recipient of the message, and send the message to the client application 116b (or device) associated with the intended recipient. One will appreciate that the communication manager 830 can direct a message for a recipient to multiple client devices associated with the recipient (i.e., each device upon which the user has installed a version of the client application 116a).

The status manager 832 can track the status of users (e.g., senders, recipients) of the client applications 116a, 116b and/or the client devices 104a, 104b. For example, the status manager 832 can identify when a user is logged into the client application 116a, when a user is active on the client application 116a, when a client device associated with a user or user account is online or active. The status manager 832 can send indications (such as push notifications) to the client application 116a to notify the client application 116a of the status of users, device, messages, or payments. The user interface manager 804 can add, modify, or otherwise change or update status notifications based on indications received from the status manager 832. For example, the status manager 832 can send an indication to the client application 116a indicating that another user has accessed a message, received a payment, sent a payment, is active, a device or device type a co-user is active on (e.g., mobile vs. web), etc. The user interface manager 804 in turn can update a user interface to notify a user of the status.

The network application 800 also includes an API manager 834 to manage the API that allows payment providers to integrate with the networking system 114. Specifically, the API manager 834 stores and maintains one or more sets of routines, subroutines, commands, and/or instructions associated with an API for facilitating payment transactions between users of the networking system 114. For instance, the API manager 834 can provide the API to a plurality of payment providers to allow the payment providers to make one or more calls to the API to integrate with the networking system 114. Once a payment provider has integrated with the networking system 114, the API manager 834 can determine instructions to provide to the payment provider when a user requests to perform a payment transaction that involves the payment provider. As described herein, the instructions cause the payment provider to perform one or more operations associated with processing the payment transaction in accordance with the transaction type and/or other information for processing the payment transaction.

Additionally, the API manager 834 can manage transaction records with associated with the payment transactions. Specifically, the API manager 834 can communicate with the payment engine 802 to obtain information associated with the payment transaction for storing in a transaction record. Storing the transaction record with the payment transaction information allows the networking system 114 to access a payment history for a user at a later date. Although the description herein describes the API manager 834 being part of the network application 800, the API manager 834 may alternatively be part of the payment engine 802 or both the network application 800 and the payment engine 802.

The network application 800 may also include a message database 836. The message database 836 can maintain message data representative of content of messages from electronic messaging sessions among a plurality of participants. The message database 836 may maintain status data representative of the information mentioned above that the status manager 832 tracks. The message database 836 can thus provide an archive of messaging threads, which the network application can provide to a user on demand or once a user logs into the client application 116*a* using a new computing device.

As mentioned, the user profile database 838 stores user profile information for users. In one or more embodiments, user profile information includes payment credentials (i.e., a payment token representing a payment authorization number, as described previously) for a credit card, a debit card, a deposit account or other bank accounts, gift card accounts, store credit accounts, etc. The user profile database 838 can also store additional information associated with the payment credentials, such as expiration dates, security codes, address information, and/or other information. User profile information can also include one or more default payment method for payment transactions for one or more merchants or co-users.

In one or more additional embodiments, the network application 800 can include a risk calculator 840 to determine a risk associated with a sender, a recipient, and/or a particular payment transaction. Specifically, the risk calculator 840 can determine whether the sender/recipient is a fraudster based on information associated with the sender/recipient in order to prevent fraudulent payment transactions. For example, the risk calculator 840 can determine the likelihood of fraudulent activity based on activity or information associated with the sender/recipient in connection with the network application. Determining a risk associated with users involved in payment transactions can also be useful in determining whether to process a particular payment transaction.

For example, in one or more embodiments, the network application 800 can determine whether a risk associated with a particular user satisfies a predetermined threshold. In particular, the network application 800 can determine whether a user is a fraudster (e.g., a scam account or software posing as a real person) based on a "realness" score. For example, if the risk associated with the sender is below a predetermined threshold (i.e., a high-risk level), the network application can determine that the user is likely a fraudster and notify the networking system 114 that the user is a fraudster. If the user has a high-risk level, the networking system 114 can stop a payment transaction between the user and the recipient.

More specifically, the risk calculator 840 may analyze social network data in order to determine a "realness" score for the sender. For example, in one or more embodiments, the risk calculator 840 may determine a realness score on whether a user has been tagged in media posted to the social networking system by one or more co-users, whether co-users of the user recognized the potential user's previous one or more birthdays (i.e., wished the potential recipient a "happy birthday"), the number or volume of messages exchanged between the user and co-users via the social networking system, whether co-users of the potential recipient have indicated agreement or solidarity (i.e., "liked") with posts made by the user, and/or whether co-users of the user have commented on posts made by the user.

As mentioned previously, the payment engine 802 can include a payment manager 860. The payment manager 860 of FIG. 8 can integrate the sending and receiving of payment requests and initiate payment transactions, and may employ one or more application programming interfaces (APIs). For example, upon the communication manager 830 receiving a payment request, the communication manager 830 can send any payment details to the payment manager 860. The payment manager 860 can then use the payment details retrieved from the payment request and instructions obtained from the API manager 834 to provide a message to a payment provider 108*a* to initiate a payment transaction.

According to one or more embodiments, the networking system 114 can maintain the payment engine 802 separate from the network application 800. For example, the networking system 114 can implement payment processes associated with the payment engine 802 separately from at least some of the functionality of the network application 800 (e.g., using a messaging database for recovery). To illustrate, the networking system 114 can implement the functionality of the payment engine 802 on a first group of one or more servers and the functionality of the network application 800 on a second group of one or more servers. Implementing functionality of the payment engine 802 and the network application 800 on separate servers can allow the networking system 114 to ensure that at least some of the financial information associated with the users is maintained apart from the network application to comply with Payment Card Industry (PCI) standards. Alternative configurations of servers and/or software than those described herein may also allow the networking system 114 to comply with PCI standards.

The payment manager 860 can coordinate a transaction corresponding to a payment defined in a payment request according to the API provided by the API manager 834. As generally explained above, the payment manager 860 can coordinate a transaction via the payment network 112 that corresponds to a payment request, monitor the status of the transaction, and provide status information regarding the transaction. More specifically, the payment network 112 can provide instructions to the payment provider 108*a* to perform the transaction, including causing the payment provider 108*a* to communicate with another payment provider 108*b* or a payment network 110.

In additional or alternative embodiments, the client application 116*a* can cause the sender client device 104*a* to send a payment request and/or messages associated with the payment request to the network application 800 and the payment engine 802 in parallel. In particular, when the client application 116*a* receives a selection by the sender to pay an amount to the recipient, the client application 116*a* can cause the sender client device 104*a* to send a payment request to the network application 800 and to the payment engine 802. Thus, the network application 800 can process the payment request while the payment engine 802 is also processing the payment transaction associated with the payment request. In alternative embodiments, the sender client device 104*a* can send messages to one or more servers associated with the network application 800, which can then forward the messages to the payment engine 802, or vice versa.

The transaction database 862 of FIG. 8 can provide storage for each transaction (such as in the form of a graph object), attempted or completed, the transaction ID, a date, an amount of the transaction, the payment method used, associated messages interchanged between sender and recipient related to the transaction, and any other information gathered on the transaction. The transaction database 862 can also store transaction information, such as requests associated with a user, the terms for a particular transaction, and number of payments or repayments performed and/or yet to be performed. To illustrate, the transaction database 862 can store the transaction record(s) that the API manager 834 generates for each payment transaction, as illustrate below in FIG. 9. With this information, the payment manager 860 can provide, upon request, a summary of one or more transactions to users as a history of payments requested, payments declined and payments completed.

The account manager 864 can manage information about the payment credentials of the users. Specifically, the account manager 864 can include one or more secure server devices that allow the networking system 114 to store sensitive account information for the user. For instance, the account manager 864 can store encrypted payment authorization numbers (e.g., payment account numbers), account identifiers, personal user information, or other information that the payment engine 802 maintains securely. The account manager 864 can also maintain information about payment providers associated with the various payment accounts of users.

Figure 9:
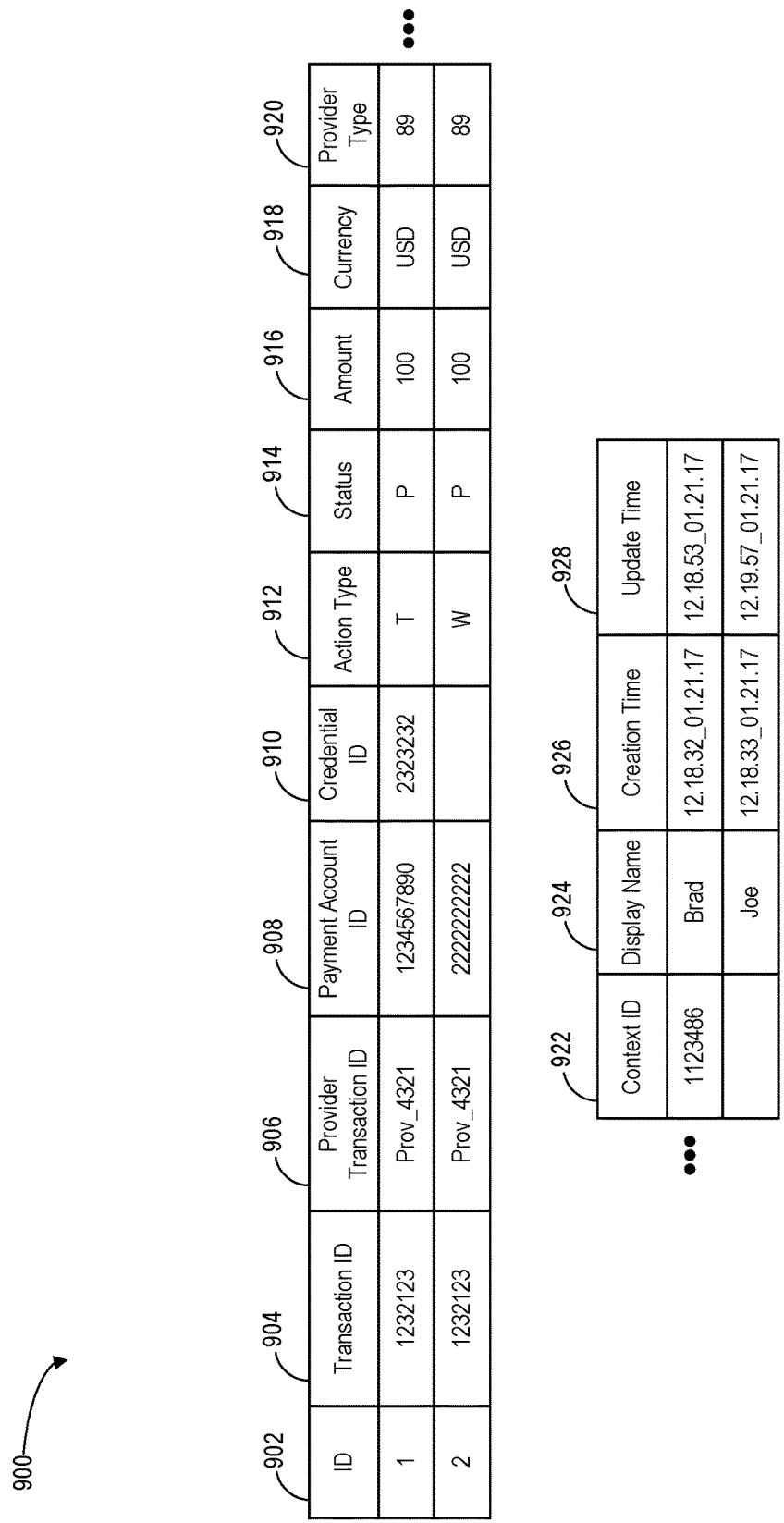
FIG. 9 illustrates an example diagram of a transaction record in accordance with one or more embodiments.

FIG. 9 illustrates an example of a transaction record 900 associated with a payment transaction. In one or more embodiments, the networking system (e.g., the networking system 114 of FIG. 1) generates at least one transaction record 900 for each payment transaction. For example, a transaction record 900 can include a table with one or more rows and columns that include information that allow the networking system to store a transaction history for a sender and a recipient. Additionally, the transaction record 900 can also allow the networking system to determine instructions to provide to the payment provider processing the payment transaction.

In one or more embodiments, the transaction record 900 includes a column 902 indicating an ID for each row that corresponds to a sender or a recipient of the payment transaction. Specifically, the column 902 includes a numerical value (e.g., "1", "2") that allows the networking system to identify whether the information in the corresponding row belongs to a sender or a recipient of the payment transaction. By storing the information for the sender and the recipient in separate rows, the networking system can maintain a transaction history for each user involved, and also determine how to instruct payment providers involved with the payment transaction.

The transaction record 900 also includes a column 904 indicating a transaction ID for the payment transaction. In particular, the networking system can assign a unique identifier for each payment transaction that allows the networking system to identify and track the details of the payment transaction separately from other payment transactions. For example, the transaction ID can include a plurality of numbers and/or other characters that associates any of the rows including the transaction ID (e.g., for the sender and the recipient) with the same payment transaction.

Additionally, the transaction record 906 includes a column 906 indicating a provider transaction ID for the payment provider to use in processing the payment transaction. Specifically, the provider transaction ID can include an alphanumeric value or other value that the payment provider for the payment transaction uses when processing and tracking payment transactions. The payment provider can provide a convention for use in generating the provider transaction ID using the API provided by the networking system. The provider transaction ID is a unique identifier for each payment transaction.

The transaction record 900 also includes a column 908 that indicates a payment account ID for the users involved in the payment transaction. For example, the payment account ID can include an identifier that corresponds to a payment account of the corresponding user. To illustrate, the transaction record 900 can include a payment account ID of the sender in the row corresponding to the sender and a payment account ID of the recipient in the row corresponding to the recipient. The payment account ID can be associated with a payment provider associated with the networking system or a third-party payment service.

The transaction record 900 also includes a column 910 that indicates a credential ID for the payment transaction. In particular, the credential ID can include an authorization number or an encrypted payment credential that the sender uses to provide funds for a payment transaction. For example, the credential ID can be based on a credit card or debit card account that the sender uses to fund the payment transaction.

The transaction record 900 can also include a column 912 indicating a current action type for the payment transaction. Specifically, the action type can indicate whether the row in the transaction record 900 corresponds to a sender or to a recipient (e.g., a "transfer" or a "withdrawal"). Additionally, the action type can indicate a plurality of other actions associated with each user of the payment transaction, including operations associated with canceling, refunding, performing a risk check, etc.

In one or more embodiments, the transaction record 900 includes a column 914 indicating a status of the payment transaction. The status can indicate whether the payment transaction is currently pending, completed, or failed. Accordingly, the status for each of the sender and the recipient is the same based on the current status of the payment transaction. Alternatively, the status can indicate a current status of the current action being performed as indicated in column 912.

The transaction record can also include a column 916 for a payment amount, and a column 918 for a currency. The payment amount and the currency can be the same or different for each row based on the currency corresponding to the sender and the recipient. For example, if both users use in the U.S., the payment amount and currency can indicate the amount of the payment transaction in U.S. dollars.

The transaction record 900 can also include a column 920 for a provider type. Specifically, the provider type can be a numerical value indicating the type of payment provider involved in the payment transaction. Additionally, the provider type can indicate the type of payment transaction based on the corresponding provider. Additionally, the provider type can allow the networking system to determine one or more other items of information to include in the transaction record 900 based on the information required to process the payment transaction for the provider type.

In one or more embodiments, the transaction record 900 includes a column 922 corresponding to a context ID of the payment transaction. Specifically, the context ID includes a unique identifier provided by the client device that allows the networking system to prevent duplicate requests. Accordingly, the context ID is stored in the row for the sender or the recipient based on the corresponding client device.

The transaction record 900 can also include a column 924 indicating the display names of the sender and the recipient. For example, the sender and the recipient can have user accounts with the networking system (e.g., social networking accounts with a social networking system). The networking system can use the display names in connection with the payment account IDs to tie the payment information with the social networking information of the users.

The transaction record 900 can also include a column 926 indicating a creation time of the corresponding row. As such, the creation time for the sender can include the time at which the networking system generated the transaction record 900 for the sender and/or the recipient. The transaction record 900 can also include a column 928 indicating a time at which each row is updated. Specifically, if any of the information changes (e.g., the action type, status, credential ID(s)), the transaction record 900 can record the updated information and then store the new update time in the corresponding column 928.

Although FIG. 9 illustrates a plurality of columns indicating various information associated with payment transactions for the sender and recipient, the networking system can include additional, or alternative, columns indicating other information associated with the sender, recipient, or payment transaction. In at least one or more additional implementations, the networking system generates a plurality of transaction records and/or tables within a transaction record to store various details of the payment transaction in connection with the sender and/or recipient. For example, the networking system generates one or more tables to store with node(s) in a social graph associated with the sender and/or the recipient. The networking system can also use information in one or more nodes to update information in one or more other nodes (e.g., updating information for a payment transaction involving the sender and the recipient).

To illustrate, the networking system can generate at least one transaction record to store in a node for a sender. For instance, the networking system can generate a transaction record including high level details of the transaction and the overall status of the transaction. Additionally, the networking system can generate one or more tables that describes the transaction in separate rows for the sender and the recipient, and updates the rows throughout the lifecycle of the transaction. The networking system can also generate table(s) for special scenarios (e.g., for canceling or refunding a transaction). The transaction record(s) stored in the sender's node includes information about the payment transaction that allows the networking system to generate electronic instructions for sending to a payment provider of the sender. The instructions that the networking system generates causes the payment provider of the sender to perform one or more commands to transfer funds from a payment account of the sender to a payment account of the recipient.

Furthermore, the networking system can store at least one table in a node of the recipient. The table(s) in the node of the recipient allow the networking system to access data from the recipient's node to identify transfers to payment accounts of the recipient. Additionally, the networking system can query the social graph for a user to determine whether any transfers for a recipient in the recipient's node, and if so, use a transaction ID from the table to fetch details from a table in a sender's node. Accordingly, the networking system can use the tables to store and organize transaction information associated with various senders/recipients, and also to generate electronic instructions for performing and updating ongoing transactions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
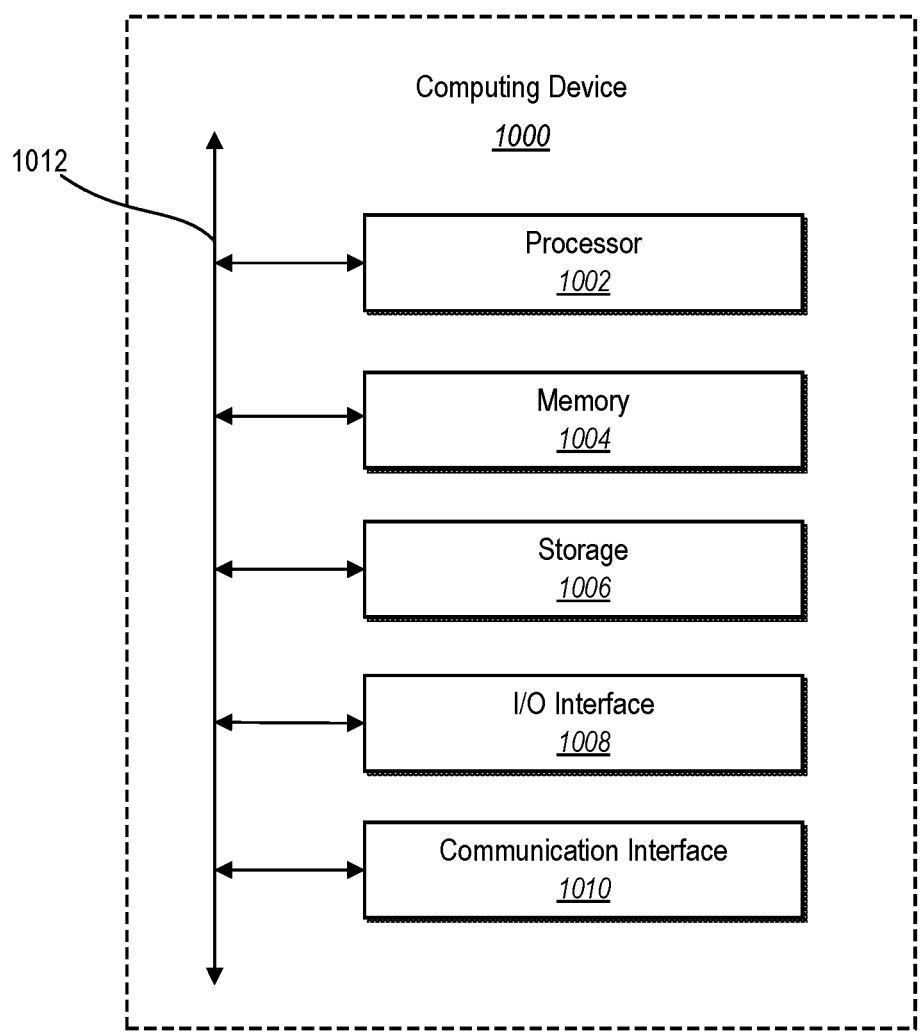
FIG. 10 illustrates a block diagram of an example computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the networking system 114. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example, and not by way of limitation, the processor 1002 may include one or more instruction caches, one or more data caches, and one or more translation lookaside buffers (TLBs). Instructions in the instruction caches may be copies of instructions in the memory 1004 or the storage 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory.

The storage device 1006 includes storage for storing data or instructions. As an example, and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touchscreen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the networking system 114 can comprise a social networking system. A social networking system may enable its users (such as persons or organizations) to interact with the system and with each other. As mentioned above, the networking system 114 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 11:
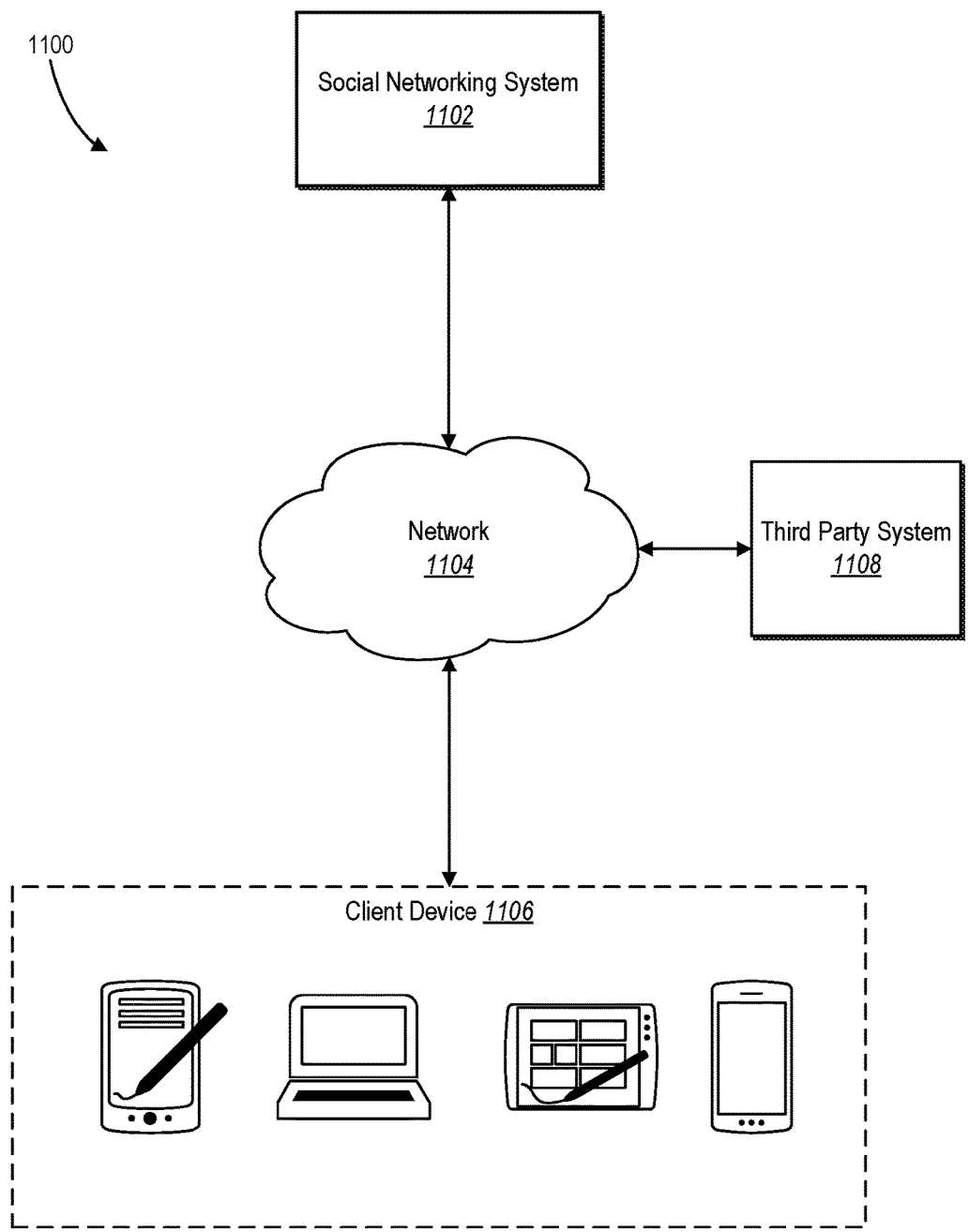
FIG. 11 illustrates an example network environment of a social networking system in accordance with one or more embodiments.

FIG. 11 illustrates an example network environment 1100 of a networking system (e.g., social networking system 1102). Network environment 1100 includes a client system 1106, a social networking system 1102, and a third-party system 1108 connected to each other by a network 1104. Although FIG. 11 illustrates a particular arrangement of client system 1106, social networking system 1102, third-party system 1108, and network 1104, this disclosure contemplates any suitable arrangement of client system 1106, social networking system 1102, third-party system 1108, and network 1104. As an example, and not by way of limitation, two or more of client system 1106, social networking system 1102, and third-party system 1108 may be connected to each other directly, bypassing network 1104. As another example, two or more of client system 1106, social networking system 1102, and third-party system 1108 may be physically or logically co-located with each other in whole or in part. Moreover, although FIG. 11 illustrates a particular number of client systems 1106, social networking systems 1102, third-party systems 1108, and networks 1104, this disclosure contemplates any suitable number of client systems 1106, social networking systems 1102, third-party systems 1108, and networks 1104. As an example, and not by way of limitation, network environment 1100 may include multiple client system 1106, social networking systems 1102, third-party systems 1108, and networks 1104.

This disclosure contemplates any suitable network 1104. As an example, and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client system 1106, social networking system 1102, and third-party system 1108 to communication network 1104 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client system 1106 may be an electronic device including hardware, software, or embedded logic components or a combination of two or more such components and capable of carrying out the appropriate functionalities implemented or supported by client system 1106. As an example, and not by way of limitation, a client system 1106 may include any of the computing devices discussed above in relation to FIG. 11. A client system 1106 may enable a network user at client system 1106 to access network 1104. A client system 1106 may enable its user to communicate with other users at other client systems 1106.

In particular embodiments, client system 1106 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1106 may enter a Uniform Resource Locator (URL) or other address directing the web browser to a particular server (such as server, or a server associated with a third-party system 1108), and the web browser may generate a Hyper Text Transfer Protocol (HTTP) request and communicate the HTTP request to server. The server may accept the HTTP request and communicate to client system 1106 one or more Hyper Text Markup Language (HTML) files responsive to the HTTP request. Client system 1106 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 1102 may be a network-addressable computing system that can host an online social network. Social networking system 1102 may generate, store, receive, and send social networking data, such as, for example, user-profile data, concept-profile data, social-graph information, or other suitable data related to the online social network. Social networking system 1102 may be accessed by the other components of network environment 1100 either directly or via network 1104. In particular embodiments, social networking system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 1102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1106, a social networking system 1102, or a third-party system 1108 to manage, retrieve, modify, add, or delete, the information stored in data store.

In particular embodiments, social networking system 1102 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 1102 may provide users of the online social network the ability to communicate and interact with other users. In particular embodiments, users may join the online social network via social networking system 1102 and then add connections (e.g., relationships) to a number of other users of social networking system 1102 whom they want to be connected to. Herein, the term "friend" may refer to any other user of social networking system 1102 with whom a user has formed a connection, association, or relationship via social networking system 1102.

In particular embodiments, social networking system 1102 may provide users with the ability to take actions on various types of items or objects, supported by social networking system 1102. As an example, and not by way of limitation, the items and objects may include groups or social networks to which users of social networking system 1102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 1102 or by an external system of third-party system 1108, which is separate from social networking system 1102 and coupled to social networking system 1102 via a network 1104.

In particular embodiments, social networking system 1102 may be capable of linking a variety of entities. As an example, and not by way of limitation, social networking system 1102 may enable users to interact with each other as well as receive content from third-party systems 1108 or other entities, or to allow users to interact with these entities through an application programming interfaces (API) or other communication channels.

In particular embodiments, a third-party system 1108 may include one or more types of servers, one or more data stores, one or more interfaces, including but not limited to APIs, one or more web services, one or more content sources, one or more networks, or any other suitable components, e.g., that servers may communicate with. A third-party system 1108 may be operated by a different entity from an entity operating social networking system 1102. In particular embodiments, however, social networking system 1102 and third-party systems 1108 may operate in conjunction with each other to provide social networking services to users of social networking system 1102 or third-party systems 1108. In this sense, social networking system 1102 may provide a platform, or backbone, which other systems, such as third-party systems 1108, may use to provide social networking services and functionality to users across the Internet.

In particular embodiments, a third-party system 1108 may include a third-party content object provider. A third-party content object provider may include one or more sources of content objects, which may be communicated to a client system 1106. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 1102 also includes user-generated content objects, which may enhance a user's interactions with social networking system 1102. User-generated content may include anything a user can add, upload, send, or "post" to social networking system 1102. As an example, and not by way of limitation, a user communicates posts to social networking system 1102 from a client system 1106. Posts may include data such as status updates or other textual data, location information, photos, videos, links, music or other similar data or media. Content may also be added to social networking system 1102 by a third-party through a "communication channel," such as a newsfeed or stream.

In particular embodiments, social networking system 1102 may include a variety of servers, sub-systems, programs, modules, logs, and data stores. In particular embodiments, social networking system 1102 may include one or more of the following: a web server, action logger, API-request server, relevance-and-ranking engine, content-object classifier, notification controller, action log, third-party-content-obj ect-exposure log, inference module, authorization/privacy server, search module, advertisement-targeting module, user-interface module, user-profile store, connection store, third-party content store, or location store. Social networking system 1102 may also include suitable components such as network interfaces, security mechanisms, load balancers, failover servers, management-and-network-operations consoles, other suitable components, or any suitable combination thereof. In particular embodiments, social networking system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 1102 to one or more client systems 1106 or one or more third-party system 1108 via network 1104. The web server may include a mail server or other messaging functionality for receiving and routing messages between social networking system 1102 and one or more client systems 1106. An API-request server may allow a third-party system 1108 to access information from social networking system 1102 by calling one or more APIs. An action logger may be used to receive communications from a web server about a user's actions on or off social networking system 1102. In conjunction with the action log, a third-party-content-object log may be maintained of user exposures to third-party-content objects. A notification controller may provide information regarding content objects to a client system 1106. Information may be pushed to a client system 1106 as notifications, or information may be pulled from client system 1106 responsive to a request received from client system 1106. Authorization servers may be used to enforce one or more privacy settings of the users of social networking system 1102. A privacy setting of a user determines how particular information associated with a user can be shared. The authorization server may allow users to opt in to or opt out of having their actions logged by social networking system 1102 or shared with other systems (e.g., third-party system 1108), such as, for example, by setting appropriate privacy settings. Third-party-content-object stores may be used to store content objects received from third parties, such as a third-party system 1108. Location stores may be used for storing location information received from client systems 1106 associated with users. Advertisement-pricing modules may combine social information, the current time, location information, or other suitable information to provide relevant advertisements, in the form of notifications, to a user.

FIG. 12 illustrates example social graph 1200. In particular embodiments, social networking system 1102 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a social networking system 1102, client system 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In particular embodiments, a user node 1202 may correspond to a user of social networking system 1102. As an example, and not by way of limitation, a user may be an individual (human user), an entity (e.g., an enterprise, business, or third-party application), or a group (e.g., of individuals or entities) that interacts or communicates with or over social networking system 1102. In particular embodiments, when a user registers for an account with social networking system 1102, social networking system 1102 may create a user node 1202 corresponding to the user, and store the user node 1202 in one or more data stores. Users and user nodes 1202 described herein may, where appropriate, refer to registered users and user nodes 1202 associated with registered users. In addition, or as an alternative, users and user nodes 1202 described herein may, where appropriate, refer to users that have not registered with social networking system 1102. In particular embodiments, a user node 1202 may be associated with information provided by a user or information gathered by various systems, including social networking system 1102. As an example, and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1204 may correspond to a concept. As an example and not by way of limitation, a concept may correspond to a place (such as, for example, a movie theater, restaurant, landmark, or city); a website (such as, for example, a website associated with social-network system 1102 or a third-party website associated with a web-application server); an entity (such as, for example, a person, business, group, sports team, or celebrity); a resource (such as, for example, an audio file, video file, digital photo, text file, structured document, or application) which may be located within social networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including social networking system 1102. As an example, and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to social networking system 1102. Profile pages may also be hosted on third-party websites associated with a third-party server 1108. As an example, and not by way of limitation, a profile page corresponding to a particular external webpage may be the particular external webpage and the profile page may correspond to a particular concept node 1204. Profile pages may be viewable by all or a selected subset of other users. As an example, and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1106 to send to social networking system 1102 a message indicating the user's action. In response to the message, social networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example, and not by way of limitation, a first user may indicate that a second user is a "friend" of the first user. In response to this indication, social networking system 1102 may send a "friend request" to the second user. If the second user confirms the "friend request," social networking system 1102 may create an edge 1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example, and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example, and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, social networking system 1102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, social networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example, and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, social networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client system 1106) may indicate that he or she likes the concept represented by the concept node 1204 by clicking or selecting a "Like" icon, which may cause the user's client system 1106 to send to social networking system 1102 a message indicating the user's liking of the concept associated with the concept-profile page. In response to the message, social networking system 1102 may create an edge 1206 between user node 1202 associated with the user and concept node 1204, as illustrated by "like" edge 1206 between the user and concept node 1204. In particular embodiments, social networking system 1102 may store an edge 1206 in one or more data stores. In particular embodiments, an edge 1206 may be automatically formed by social networking system 1102 in response to a particular user action. As an example, and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example, and not by way of limitation, advertisements may be included among the search results of a search-results page, where sponsored content is promoted over non-sponsored content.

In particular embodiments, an advertisement may be requested for display within social networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1102 may execute or modify a particular action of the user.

An advertisement may also include social networking-system functionality that a user may interact with. As an example, and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1102) or RSVP (e.g., through social networking system 1102) to an event associated with the advertisement. In addition, or as an alternative, an advertisement may include social networking-system context directed to the user. As an example, and not by way of limitation, an advertisement may display information about a friend of the user within social networking system 1102 who has taken an action associated with the subject matter of the advertisement.

In particular embodiments, social networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 90% of the overall coefficient, while the relationship between the user and the object may comprise 40% of the overall coefficient. In particular embodiments, the social networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1102 may calculate a coefficient based on a user's actions. Social networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Social networking system 1102 may analyze a user's actions to determine whether one or more of the actions indicate an affinity for subject matter, content, other users, and so forth. As an example, and not by way of limitation, if a user may make frequently posts content related to "coffee" or variants thereof, social networking system 1102 may determine the user has a high coefficient with respect to the concept "coffee". Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In particular embodiments, social networking system 1102 may calculate a coefficient based on the type of relationship between particular objects. Referencing the social graph 1200, social networking system 1102 may analyze the number and/or type of edges 1206 connecting particular user nodes 1202 and concept nodes 1204 when calculating a coefficient. As an example, and not by way of limitation, user nodes 1202 that are connected by a spouse-type edge (representing that the two users are married) may be assigned a higher coefficient than user nodes 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example, and not by way of limitation, if a user is tagged in first photo, but merely likes a second photo, social networking system 1102 may determine that the user has a higher coefficient with respect to the first photo than the second photo because having a tagged-in-type relationship with content may be assigned a higher weight and/or rating than having a like-type relationship with content. In particular embodiments, social networking system 1102 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, social networking system 1102 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1200. As an example, and not by way of limitation, social-graph entities that are closer in the social graph 1200 (i.e., fewer degrees of separation) may have a higher coefficient than entities that are further apart in the social graph 1200.

In particular embodiments, social networking system 1102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1106 of the user). A first user may be more interested in other users or concepts that are closer to the first user. As an example, and not by way of limitation, if a user is one mile from an airport and two miles from a gas station, social networking system 1102 may determine that the user has a higher coefficient for the airport than the gas station based on the proximity of the airport to the user.

In particular embodiments, social networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1102 may provide information that is relevant to user's interests and current circumstances, increasing the likelihood that they will find such information of interest. In particular embodiments, social networking system 1102 may generate content based on coefficient information. Content objects may be provided or selected based on coefficients specific to a user. As an example, and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1102 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In particular embodiments, social networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, social networking system 1102 may calculate the coefficient (or access the coefficient information if it has previously been calculated and stored). In particular embodiments, social networking system 1102 may measure an affinity with respect to a particular process. Different processes (both internal and external to the online social network) may request a coefficient for a particular object or set of objects. Social networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/971,1027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by social networking system 1102 or shared with other systems (e.g., third-party system 1108). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1102 may send a request to the data store for the object. The request may identify the user associated with the request and may only be sent to the user (or a client system 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method, comprising:

providing, by one or more servers associated with a social network, an application program interface that allows payment providers to integrate with the social network in a manner that allows users of the payment providers to transfer funds to other users in the social network;

receiving, at the one or more servers associated with the social network and from a client device associated with a user, a request to initiate a payment transaction between the user and a co-user of the social network;

identifying, by the one or more servers associated with the social network, a first payment account of the user with a first payment provider;

accessing, by the one or more servers associated with the social network, a social graph of the social network to identify a second payment account associated with the co-user from a node of the social graph comprising information about the co-user, the second payment account being with a second payment provider, the second payment provider differing from the first payment provider;

generating, by the one or more servers associated with the social network according to the application program interface, one or more electronic instructions comprising one or more commands that enable the first payment provider to complete the payment transaction directly with the second payment provider by causing the first payment provider to communicate directly with the second payment provider; and sending, by the one or more servers associated with the social network, payment account information for the first payment account and the second payment account and the one or more electronic instructions to the first payment provider to cause the first payment provider to communicate directly with the second payment provider and perform the one or more commands to transfer funds from the first payment account of the user to the second payment account associated with the co-user by:

sending an instruction that causes the first payment provider to generate a temporary account for the co-user;
sending an instruction that causes the first payment provider to first transfer the funds from the first payment account of the user to the temporary account;
receiving a response indicating that the co-user accepted the payment transaction from the user; and
transferring the funds from the temporary account to the second payment account associated with the co-user.

2. The method as recited in claim 1, wherein providing the application program interface that allows payment providers to integrate with the social network comprises configuring the application program interface such that payment providers that integrate with the social network can send and receive payments from any other payment provider integrated with the social network by communicating directly with another payment provider integrated with the social network via the application program interface of the one or more servers associated with the social network.

3. The method as recited in claim 1, further comprising sending, to the first payment provider, an instruction that causes the first payment provider to initiate a payment transaction to transfer the funds from the first payment account to the second payment account in a cash-out payment transaction, wherein the second payment account associated with the co-user comprises a payment account of a third party entity for providing a cash payment to the co-user.

4. The method as recited in claim 1, wherein the temporary account is a no-load account that prevents the co-user from transferring additional funds into the no-load account.

5. The method as recited in claim 1, further comprising:
sending, to the first payment provider, an instruction to initiate the payment transaction with the second payment provider;
receiving, from the first payment provider in response to the instruction to initiate the payment transaction, a response indicating that the first payment provider requires authorization to process the payment transaction;
receiving, from the client device, an authorization credential associated with the first payment account; and
validating the authorization credential with the first payment provider.

6. The method as recited in claim 1, wherein sending payment account information for the first payment account and the second payment account comprises:
receiving, from the first payment provider, a response comprising a redirect message associated with authorizing the payment transaction; and
sending, to the client device, the redirect message to redirect the client device to the first payment provider.

7. The method as recited in claim 1, further comprising:
determining that the request to initiate the payment transaction comprises a request to initiate the payment transaction between the user and a plurality of recipients, the plurality of recipients comprising the co-user;
identifying a plurality of payment accounts associated with the plurality of recipients; and
sending payment account information for the plurality of payment accounts associated with the plurality of recipients and one or more electronic instructions to the first payment provider to cause the first payment provider to communicate directly with one or more payment providers associated with the plurality of payment accounts and perform one or more commands to transfer funds from the first payment account to the plurality of payment accounts associated with the plurality of recipients in separate transactions.

8. The method as recited in claim 1, wherein:
receiving the request to initiate a payment transaction between the user and the co-user comprises receiving a request to initiate a payment transaction to transfer funds from a plurality of users of the social network to a plurality of co-users; and
generating the one or more electronic instructions comprises generating one or more electronic instructions comprising one or more commands that enable a plurality of payment providers associated with the plurality of users to complete the payment transaction by causing the plurality of payment providers to communicate directly with at least one payment provider.

9. The method as recited in claim 8, further comprising:
sending payment account information for a plurality of payment accounts associated with the plurality of users and the one or more instructions to the plurality of payment providers to cause the plurality of payment providers to communicate directly with the at least one payment provider and perform one or more commands to transfer funds from the plurality of payment accounts to the temporary account; and
sending one or more instructions to the first payment provider to cause the first payment provider to communicate directly with one or more payment providers associated with the plurality of co-users and perform one or more commands to transfer funds from the temporary account to a plurality of payment accounts of the plurality of co-users according to a distribution of the payment transaction.

10. The method as recited in claim 1, wherein generating the one or more electronic instructions comprises:
generating, according to the application program interface, a plurality of electronic transaction records comprising transaction information for transferring funds from the first payment account of the user to the second payment account with the co-user;
storing, within the social graph of the social network, a first transaction record from the plurality of electronic transaction records in a node of the social graph comprising information associated with the user and a second transaction from the plurality of electronic transaction records in the node of the social graph comprising information about the co-user; and
generating the one or more electronic instructions based on transaction information in the first transaction record.

11. The method as recited in claim 1, further comprising:
receiving, from the first payment provider, an indication whether the payment transaction was successful; and
storing information indicating whether the payment transaction was successful in a database in a social graph of the social network.

12. A system, comprising:
at least one processor; and
a non-transitory computer readable storage medium comprising instructions that, when executed by the at least one processor, cause the system to:
provide, by one or more servers associated with a social network, an application program interface that allows payment providers to integrate with the social network in a manner that allows users of the payment providers to transfer funds to other users in the social network;
receive, at the one or more servers associated with the social network and from a client device associated with a user, a request to initiate a payment transaction between the user and a co-user of the social network;

identify, by the one or more servers associated with the social network, a first payment account of the user with a first payment provider;

access, by the one or more servers associated with the social network, a social graph of the social network to identify a second payment account associated with the co-user from a node of the social graph comprising information about the co-user, the second payment account being with a second payment provider, the second payment provider differing from the first payment provider;

generate, by the one or more servers associated with the social network according to the application program interface, one or more electronic instructions comprising one or more commands that enable the first payment provider to complete the payment transaction directly with the second payment provider by causing the first payment provider to communicate directly with the second payment provider; and send, by the one or more servers associated with the social network, payment account information for the first payment account and the second payment account and the one or more electronic instructions to the first payment provider to cause the first payment provider to communicate directly with the second payment provider and perform the one or more commands to transfer funds from the first payment account of the user to the second payment account associated with the co-user bar:

sending an instruction that causes the first payment provider to generate a temporary account for the co-user;

sending an instruction that causes the first payment provider to first transfer the funds from the first payment account of the user to the temporary account;

receiving a response indicating that the co-user accepted the payment transaction from the user; and transferring the funds from the temporary account to the second payment account associated with the co-user.

13. The system as recited in claim 12, further comprising instructions that, when executed by the at least one processor, cause the system to:

send, to the first payment provider, an initiation instruction to initiate the payment transaction with the second payment provider, the initiation instruction indicating the payment account information for the first payment account of the user;

receive, from the first payment provider in response to the instruction to initiate the payment transaction, a response indicating that the first payment provider requires authorization to process the payment transaction;

receive, from the client device, an authorization credential associated with the first payment account; and validate the authorization credential with the first payment provider.

14. The system as recited in claim 12, wherein the temporary account is a no-load account that prevents the co-user from transferring additional funds into the no-load account.

15. The system as recited in claim 12, further comprising instructions that, when executed by the at least one processor, cause the system to send the payment account information for the first payment account and the second payment account and the one or more electronic instructions to the first payment provider to cause the first payment provider to communicate directly with the second payment provider and perform the one or more commands to transfer funds from the first payment account of the user to the second payment account associated with the co-user by:

sending an instruction that causes the first payment provider to communicate directly with a separate payment provider and perform one or more commands to generate the temporary account and transfer funds from the payment account of the user to the temporary account, the temporary account being associated with the separate payment provider; and sending, based on the response indicating that the co-user accepted the payment transaction, an instruction that causes the first payment provider to perform one or more commands to communicate with the separate payment provider to transfer funds from the temporary account to the second payment account associated with the co-user.

16. The system as recited in claim 12, wherein at least one of the first payment account of the user or the second payment account associated with the co-user comprises a stored value account.

17. The system as recited in claim 12, further comprising instructions that, when executed by the at least one processor, cause the system to send, to the first payment provider, an instruction that causes the first payment provider to initiate a payment transaction to transfer the funds from the first payment account to the second payment account in a cash-out payment transaction, wherein the second payment account associated with the co-user comprises a payment account of a third party entity for providing a cash payment to the co-user.

18. The system as recited in claim 12, further comprising instructions that, when executed by the at least one processor, cause the system to perform, in response to receiving the request to initiate the payment transaction, a risk check to determine whether the payment transaction is a fraudulent payment transaction by accessing information about the user and the co-user in a social graph of the social network.

19. A non-transitory computer readable storage medium comprising instructions that, when executed by at least one processor, cause a computer system to:

provide, by one or more servers associated with a social network, an application program interface that allows payment providers to integrate with the social network in a manner that allows users of the payment providers to transfer funds to other users in the social network;

receive, at the one or more servers associated with the social network and from a client device associated with a user, a request to initiate a payment transaction between the user and a co-user of the social network;

identify, by the one or more servers associated with the social network, a first payment account of the user with a first payment provider;

access, by the one or more servers associated with the social network, a social graph of the social network to identify a second payment account associated with the co-user from a node of the social graph comprising information about the co-user, the second payment account being with a second payment provider, the second payment provider differing from the first payment provider;

generate, by the one or more servers associated with the social network according to the application program interface, one or more electronic instructions comprising one or more commands that enable the first payment provider to complete the payment transaction directly with the second payment provider by causing the first payment provider to communicate directly with the second payment provider; and send, by the one or more servers associated with the social network, payment account information for the first payment account and the second payment account and the one or more electronic instructions to the first payment provider to cause the first payment provider to communicate directly with the second payment provider and perform the one or more commands to transfer funds from the first payment account of the user to the second payment account associated with the co-user by:

sending an instruction that causes the first payment provider to generate a temporary account for the co-user;

sending an instruction that causes the first payment provider to first transfer the funds from the first payment account of the user to the temporary account;

receiving a response indicating that the co-user accepted the payment transaction from the user; and transferring the funds from the temporary account to the second payment account associated with the co-user.

20. The non-transitory computer readable storage medium as recited in claim 19, further comprising instructions that, when executed by the at least one processor, cause the computer system to send the one or more electronic instructions to the first payment provider to cause the first payment provider to perform the one or more commands to transfer funds from the first payment account of the user to the second payment account associated with the co-user by:

sending an instruction that causes the first payment provider to communicate directly with a separate payment provider and perform one or more commands to generate the temporary account and transfer funds from the first payment account of the user to the temporary account, the temporary account being associated with the separate payment provider; and sending, based on the response indicating that the co-user accepted the payment transaction, an instruction that causes the first payment provider to perform one or more commands to communicate with the separate payment provider to transfer funds from the temporary account to the second payment account associated with the co-user.

\* \* \* \* \*